(12) United States Patent
Rangachari

(10) Patent No.: US 7,210,127 B1
(45) Date of Patent: Apr. 24, 2007

(54) METHODS AND APPARATUS FOR EXECUTING INSTRUCTIONS IN PARALLEL

(75) Inventor: Achutha Raman Rangachari, Chennai (IN)

(73) Assignee: Sun Microsystems, Palo Alto, CA (US)

( * ) Notice: Subject to any disclaimer, the term of this patent is extended or adjusted under 35 U.S.C. 154(b) by 730 days.

(21) Appl. No.: 10/406,709

(22) Filed: Apr. 3, 2003

(51) Int. Cl.
*G06F 9/14* (2006.01)
(52) U.S. Cl. ...................... 717/128; 717/131
(58) Field of Classification Search ................ 717/128, 717/131
See application file for complete search history.

(56) References Cited

U.S. PATENT DOCUMENTS

| | | | |
|---|---|---|---|
| 5,991,790 A | 11/1999 | Shah et al. | 709/100 |
| 6,205,465 B1 | 3/2001 | Schoening et al. | 709/102 |
| 6,233,725 B1 | 5/2001 | Beadle et al. | 717/1 |
| 6,266,811 B1 | 7/2001 | Nabahi | 717/11 |
| 6,345,351 B1 | 2/2002 | Holmberg | 711/203 |
| 6,351,844 B1* | 2/2002 | Bala | 717/128 |
| 6,374,238 B1 | 4/2002 | Iwata et al. | 707/3 |
| 6,505,228 B1 | 1/2003 | Schoening et al. | 709/106 |
| 6,598,012 B1 | 7/2003 | Berry et al. | 702/187 |
| 6,658,655 B1 | 12/2003 | Hoogerbrugge et al. | 717/139 |
| 6,665,708 B1 | 12/2003 | Tikekar et al. | 709/215 |
| 6,697,835 B1 | 2/2004 | Hanson et al. | 709/201 |
| 6,718,457 B2 | 4/2004 | Tremblay et al. | 712/212 |
| 6,732,084 B1 | 5/2004 | Kabra et al. | 707/2 |
| 6,738,967 B1 | 5/2004 | Radigan | 717/146 |
| 6,817,013 B2* | 11/2004 | Tabata et al. | 717/151 |
| 2004/0024995 A1* | 2/2004 | Swaine | 712/227 |
| 2004/0117770 A1* | 6/2004 | Swoboda et al. | 717/128 |

OTHER PUBLICATIONS

R. Radhakrishnan, et al., "Allowing for ILP in an Embedded Java Processor", Laboratory for Computer Architecture, Electrical and Computer Engineering Department, The University of Texas at Austin, pp. 294-305, Jun. 2000, International Symposium on Computer Architecture.

(Continued)

*Primary Examiner*—Tuan Dam
*Assistant Examiner*—Isaac Tecklu
(74) *Attorney, Agent, or Firm*—Chapin IP Law, LLC; Barry W. Chapin, Esq.

(57) ABSTRACT

A system, method and apparatus for executing instructions in parallel identify a set of traces within a segment of code, such as Java bytecode. Each trace represents a sequence of instructions within the segment of code that are execution structure dependent, such as stack dependent. The system, method and apparatus identify a dependency order between traces in the identified set of traces. The dependency order indicates traces that are dependent upon operation of other traces in the segment of code. The system, method and apparatus can then execute traces within the set of traces in parallel and in an execution order that is based on the identified dependency order, such that at least two traces are executed in parallel and such that if the dependency order indicates that a second trace is dependent upon a first trace, the first trace is executed prior to the second trace. This system provides bytecode level parallelism for Java and other applications that utilize execution structure-based architectures and identifies and efficiently eliminates Java bytecode stack dependency.

28 Claims, 6 Drawing Sheets

OTHER PUBLICATIONS

I. Kazi, et al., "Techniques for Obtaining High Performance in Java Programs", Laboratory for Advanced Research in Computing Technology and Compilers, Department of Electrical and Computer Engineering, University of Minnesota, pp. 1-44, Sep. 2000.

D. Harty, et al., "picoJava II microArchitecture", Sun Microsystems, Inc., 1997.

R. Helaihel, et al., "JMTP: An Architecture for Exploiting Concurrency in Embedded Java Applications with Real-time Considerations", Computer Systems Laboratory, Stanford University. Nov. 1999.

M. El-Kharashi, et al., "An Operand Extraction-Based Stack Folding Algorithm for Java Processors" Department of Electrical and Computer Engineering, University of Victoria, pp. 1-5, Sep. 2000.

K. Scott, et al., "BLP: Applying ILP Techniques to Bytecode Execution", Department of Computer Science, University of Virginia, pp. 1-8, Sep. 2000.

C. Chang, et al., "Stack Operations folding in Java Processors", Department of Computer Science and Information Engineering, National Chiao Tung University, Republic of China, pp. 333-340, Proc.-Comput. Digit. Tech. vol. 145, No. 5, Sep. 1998.

K. Watanabe, et al., "Exploiting Java Instruciton/Thread Level Parallelism with Horizontal Multithreading", Department of Computer Hardware, University of Aizu, Japan and Department of Computer Science, Hosei University, Japan, Jan. 2001.

\* cited by examiner

METHODS AND APPARATUS FOR EXECUTING INSTRUCTIONS IN PARALLEL

FIELD OF THE INVENTION

The present invention generally relates to systems for execution of software instructions in parallel in a computerized device.

BACKGROUND OF THE INVENTION

Software developers typically create conventional software applications by writing software "source code" in a high-level programming language such as C, C++, Java or the like. The software developer can then operate a program called a complier that converts the high-level programming language source code into a machine understandable or machine-readable form called "object code" that the complier creates for a specific target processor architecture. A processor within a computerized device that confirms to the target architecture can "execute" the object code in order to operate the program. As an example, a software developer who creates a software application in the C programming language can use a C compiler designed for a specific processor architecture to convert the C programming language statements (i.e., source code instructions) within the application into machine language instructions that can natively execute as a program on that processor within a computerized device.

Some programming languages are designed to allow a software developer to write application code once and then operate this code on any computerized device that supports that programming language, regardless of the processor or architecture of the computerized device. As an example, a program written in the Java programming language (Java is a registered trademark of Sun Microsystems, Inc. of Palo Alto, Calif., U.S.A.) can operate on any computerized device platform that has or that implements a Java run-time environment known as a Java Virtual Machine (JVM). To run a Java program, a developer first compiles the Java program using a Java compiler (e.g., javac) that produces intermediate instructions called "bytecode". A user who desires to operate the Java program can transfer the bytecode instructions for that program to any computerized device that runs under the control of any operating system, as long as a "Java Virtual Machine" or JVM exists that can operate in conjunction with that operating system or computerized device to interpret the Java bytecodes. In other words, to accommodate a diversity of operating environments, a Java compiler doesn't generate "machine code" in the sense of native hardware instructions that execute directly in a microprocessor; but rather, the Java compiler generates bytecodes that are a high-level, machine-independent code for a hypothetical machine that is implemented by the Java interpreter and run-time system known as a Java Virtual Machine. The primary benefit of the interpreted bytecode approach is that compiled Java language programs are portable to any system on which a Java Virtual Machine exists.

There has been an ongoing trend in the information technology industry to attempt to execute software programs as rapidly as possible. There are various conventional advancements that provide for increased execution speed of software programs. One technique for increasing execution speed of a program is called parallelism. Parallelism is the practice of executing or performing multiple things at once. Parallelism can be possible on multiple levels, from executing multiple instructions at once, to executing multiple threads at once, to executing multiple programs at once. Instruction Level Parallelism or ILP is parallelism at the lowest level and involves executing multiple instructions at once. Processors that exploit ILP are typically called multiple-issue processors, meaning they can issue multiple instructions in a single clock cycle to the various functional units on the processor chip.

There are different types of conventional multiple-issue processors. One multiple-issue processor is a superscalar processor in which a sequential list of program instructions are dynamically scheduled, and the processor decides which instructions can be executed on the same clock cycle, and sends them out to their respective functional units to be executed. This type of multi-issue processor is called an in-order-issue processor since issuance of instructions is performed in the same sequential order as the program sequence, but issued instructions may complete at different times (e.g., short instructions requiring fewer cycles may complete before longer ones requiring more cycles). Another type of multi-issue processor is called a VLIW (Very Large Instruction Width) processor. A VLIW processor depends on a compiler to do all the work of instruction reordering and the processor executes the instructions that the compiler provides as fast as possible according to the compiler-determined order. Other types of multi-issue processors issue out of order instructions, meaning the instruction issue order is not be the same order as the order of instructions as they appear in the program.

Conventional techniques for executing instructions using ILP often utilized look-ahead techniques to find a larger amount of instructions that can execute in parallel within an instruction window. Looking-ahead often involves determining which instructions might depend upon others during execution for such things as shared variables, shared memory, interference conditions, and the like. When a scheduling portion of the processor detects a group of instructions that do not interfere or depend on each other, the processor can issue execution of these instructions in parallel thus conserving processor cycles and resulting in faster execution of the program.

Conventional computer systems that execute programs written in a programming language such as Java operate a Java Virtual Machine during run-time to interpret or otherwise convert the Java bytecode instructions into native machine language instructions. As an example, to execute a series of Java bytecode instructions, a Java virtual machine can operate a program called a Just-In-Time (JIT) compiler. A JIT compiler is a software layer that compiles or interprets bytecode instructions just before they are executed thus converting the Java bytecode into native machine language code for the processor to natively execute at that moment. Generally then, general purpose computerized devices use either interpretation or Just-In-Time (JIT) compilation to convert the Java bytecodes to native instructions that are then run on conventional processors.

Java developers have also created conventional processors that can execute Java bytecode directly. Such Java bytecode processors or "Java processors" are becoming popular as software application developers create an increasingly large number of complex server and other software applications in Java. Due to the nature of these many of these applications, it is important to achieve very high performance during their execution. The designs of such bytecode processors are mainly based on stack architectures.

One conventional technique that has been used to enhance some JVM implementations in hardware is called "instruction folding", in which a processor "folds" a set of bytecodes into one instruction. Instruction folding increases the performance of bytecode execution by coalescing a bytecode, for example, which just spends processor cycle time moving data from a stack to the operational units, into another bytecode instruction that does the actual operation on the moved data, rather than executing each bytecode instruction separately.

All conventional Java virtual machine and Java processors utilize a stack-based architecture for execution of Java bytecode. That is, a conventional Java virtual machine and/or a Java processor do not use registers to hold intermediate data values, but rather uses the Java operand stack for storage of all intermediate data values. This approach was taken by Java's designers to keep the Java virtual machine's instruction set compact and to facilitate implementation on architectures with few or irregular general-purpose registers.

During execution of a program containing Java bytecode instructions, the Java virtual machine can recognize different execution threads or paths through the program. During execution of a Java thread, the Java virtual machine provides a Java stack to store the state of execution of bytecode instructions that are interpreted or JIT compiled in that thread. The state of execution can include local variables, bytecode parameters called "operands", and results of individual bytecode instructions "opcodes" that each correspond to the different processing functions of each bytecode instruction in the Java bytecode instruction set. There is no way for a thread to access or alter the Java stack of another thread. During the execution of each Java bytecode instruction, the Java virtual machine may push and/or pop values onto and off of the stack, thus using the stack as a workspace. Many instructions pop values from the operand stack, operate on them, and push the resultant contents back onto the stack. For example, an "iadd" bytecode instruction adds two integers by popping two integer values off the top of the operand stack, adding them together and pushing the integer result back onto the stack associated with that thread.

SUMMARY

Conventional technologies that provide high-performance execution of software applications such as Java programs suffer from a variety of deficiencies related to performance. In particular, when a conventional software application written in a programming language such as Java executes as bytecode, since the conventional Java virtual machine interprets bytecodes into machine language or uses a JIT compiler to provide just-in-time compilation of the bytecode instructions, the instruction window available for ILP performance enhancement (i.e., parallel execution of instructions) is significantly limited due to the fact that each Java bytecode instruction is interpreted or JIT compiled in real-time, just prior to execution on the processor. As a result, conventional superscalar ILP technologies such as pipelining look-ahead or other techniques for enhancing the execution speed of the resultant machine language instructions are significantly limited when applied to execution of programs written in a language such as Java. Stated differently, bytecode level parallelism does not significantly benefit from conventional techniques exploited by superscalar processors to provide instruction level parallelism.

In addition, the hardware realization of the Java Virtual Machine (JVM) as a bytecode Java processor, which directly executes the bytecode in the hardware using a stack-based hardware architecture, may be faster than the JIT compiled bytecode execution, but executing instructions in parallel in such a hardware bytecode processor is harder because of the inherent sequential nature of bytecodes that are targeted for a stack-based machine, mainly due to stack operand dependency. That is, a major issue in a hardware bytecode execution architecture for direct execution of Java bytecode is that the extent of ILP is limited by the dependencies introduced by stack operands between Java bytecodes. An example best illustrates this problem.

Consider, for example, the Java bytecode code snippet shown below in Table 1 that illustrates how stack dependencies limit ILP in Java bytecodes. In this example, each bytecode instruction is labeled "b1," "b2" and so forth.

TABLE 1

Example code and corresponding bytecodes

| Java bytecodes | | Operand stack contents | |
|---|---|---|---|
| b1 | iload a | a | T1 |
| b2 | iload b | a, b | |
| b3 | mul | t1 (= a * b) | |
| b4 | iload b | t1, b | |
| b5 | iload c | t1, b, c | |
| b6 | mul | t1, t2 (= b * c) | |
| b7 | add | x (= t1 + t2) | |
| b8 | istore | | |
| b9 | iload a | a | T2 |
| b10 | iload c | a, c | |
| b11 | iload b | a, c, b | |
| b12 | iload d | a, c, b, d | |
| b13 | mul | a, c, t3 (= b * d) | |
| b14 | sub | a, t4 (= c − t3) | |
| b15 | mul | y (= a * t4) | |
| b16 | istore | | |

The second column in Table 1 above shows the contents of the operand stack after the execution of each bytecode instruction. Note that the labels T1 and T2 indicate traces identified by embodiments of this invention and will be explained shortly. Assume that the operand stack is initially empty. Then, the operand stack contains one or more operands after bytecode instruction b1 and remains non-empty until after instruction b8. Thus the bytecode instructions b1 to b8 have to execute sequentially on a stack machine, as they depend on the contents of the operand stack. Such dependencies are referred to as "stack dependencies". Bytecode instructions starting from b9 are stack-independent of any of the earlier instructions b1 through b8, but in an in-order issue machine b9 cannot be issued until all earlier instructions (b1 to b8) have been issued. Thus a simple stack machine cannot exploit any bytecode level parallelism in the above sequence. Assuming each instruction takes one cycle to execute, the Java bytecode sequence shown in Table 1 (column 1) will take 16 cycles in a strict stack machine. Accordingly, conventional techniques for increasing performance of the aforementioned example code snippet are severely limited. Conventional folding techniques may be used to somewhat enhance the execution speed, but not to the point of becoming fully parallel.

Embodiments of the invention significantly overcome the aforementioned deficiencies and provide unique mechanisms and techniques to provide for execution of program instructions in parallel, such as by providing mechanisms and techniques that provide for parallel execution of Java bytecode instructions. To do so, embodiments of the invention are based in part on an observation that during execution of Java bytecode, there are periods of time in execution that the operand stack becomes empty or "clean", referred to herein as a clean condition of the stack execution structure.

According to embodiments of this invention, a sequence of instructions such as Java bytecodes between any two consecutive clean-stack-points form a bytecode-trace or a "trace". In embodiments of this invention, traces that are not dependent upon one another, as will be explained, can be executed in parallel to increase performance of programs such as Java applications.

Specifically, referring back to the example bytecode sequence in Table 1 above, the operand stack becomes empty after executing instruction b8 and also after instruction b16. More precisely, if the stack pointer is pointing to some position p at the beginning of a Java method or a basic block, then after executing the sequence of bytecode instructions b1 to b8, the stack pointer regains or returns to its old value p. The term "clean-condition" or clean point is used herein to refer to a clean stack point, which is a point in time of execution of program code at which the stack-pointer valued is restored to an original clean or empty value relative to an earlier value that occurred at the beginning of a trace. For purposes of this invention, the stack structure is referred to herein as an "execution structure" and embodiments of the invention are not limited to using only a stack as an execution structure. Any type of memory storage structure can be used as an execution structure in embodiments of this invention.

As noted above, in this invention, the sequence of Java bytecodes between any two consecutive clean-stack-points form a bytecode-trace or a "trace". Since each bytecode-trace is stack independent of every other bytecode-trace, embodiments of the invention can execute multiple bytecode-traces in parallel. In the example code of Table 1 above, there are two bytecode traces: one trace, T1, from b1 to b8 and another trace, T2, from b9 to b16. By taking instructions from different bytecode traces and issuing them in parallel to multiple functional processor units, each of which has its own private operand stack execution structure, instruction-level-parallelism can be exploited for applications such as Java programs. This instruction-issue approach is referred to herein in embodiments of the invention as simultaneous multi-trace instruction issue (SMTI). If the bytecodes of traces T1 and T2 in Table 1 are issued in this manner using embodiments of this invention, execution of the entire sequence will require only 8 cycles, in contrast with the 16 needed with in-order single issue stack machine. Application of other enhancement techniques on traces such as folding can further increase performance.

Embodiments of the invention thus provide methods and apparatus for executing instructions in parallel and provide for a parallel execution trace processor that includes a trace detector, a dependency detector, a trace scheduler and a trace executer, as will be explained. According to the general processing operations performed by the mechanisms and techniques of embodiments of the invention, such embodiments operate a trace detector to identify a set of traces within a segment of code. The segment of code may be, for example, a basic block of Java bytecode or a thread of bytecode instructions or an entire program. Each trace represents a sequence of instructions within the segment of code that are execution structure dependent. In particular, in the Java bytecode example, each trace T1 and T2 represents a sequence of bytecode instructions within the basic block or thread that are stack independent with respect to each other, and are stack dependent for instructions within a single trace. That is, at the beginning of a trace the stack is empty with respect to instruction operands and data associated with the basic block and instructions within the trace can utilize the stack execution structure to store operands and at the end of the trace the stack pointer has returned to its original position that existed at the beginning of the trace. Using mechanisms and techniques explained herein, the trace detector identifies all traces in the segment of code and can repeat this processing for all segments of code in a program to be executed. This can be done before execution. Using this processing, the trace detector operating as explained herein can remove stack dependencies from the bytecode operations in trace segment of code within the program such that two or more traces can execute in parallel, since by definition each trace is stack independent of the other.

After identifying the traces, embodiments of the invention operated a trace dependency detector to identify a dependency order between traces in the identified set of traces (i.e., identified by the trace detector). The trace dependency order indicates traces that are dependent upon operation of other traces in the segment of code. As an example, if one trace contains bytecode instructions that reference variables that are later utilized by another trace, the later trace is said to be dependent upon the first trace. The trace dependency detector can perform processing as explained herein to detect which traces are dependent upon which other traces with respect to local data dependencies between variables accessed by bytecode instructions within the traces. The trace dependency detector produces a trace dependency structure such as a table that indicates dependencies of execution of traces upon one another.

After embodiments of the invention have identified set of traces within a segment of code and have identified all traces within all segments of code within a program, and have further identified dependencies between traces, embodiments of the invention can operate a trace scheduler in conjunction with a trace executer to schedules and cause execution of traces within the set of traces in parallel and in an execution order that is based on the identified dependency order, such that at least two traces are executed in parallel and such that if the dependency order indicates that if a second trace is dependent upon a first trace, the first trace is executed prior to the second trace. In other words, the trace scheduler can access a trace dependency structure to determine which traces are dependent upon which other traces and can initiate execution of non-dependent traces in parallel. Accordingly, two traces that are not dependent on each other and that are not dependent upon other traces in a basic block or in a thread can execute in parallel thus increasing execution speed of the program. It is to be understood that if there is only one trace available (e.g., remaining) to schedule and execute, the trace scheduler of this invention can select and schedule this trace alone. A significant benefit of the invention is that when there is more than one trace available for scheduling, and one is not dependent on the other, the scheduler can schedule both traces for execution. Note that if there are functional units in a trace processor that can handle execution of more than two traces are one time (e.g., three, four or more), and such traces are available for execution, embodiments of the invention are able to schedule and execute more than two traces in parallel.

After execution of a trace is complete, the trace scheduler can update the trace dependency structure to remove any trace dependencies associated with other traces in the set of traces that are dependent upon completion of execution of a trace that is now finished executing. The trace dependency structure can contain all information about trace identification, beginning and ending instruction addresses (e.g., Program Counter locations), and other information.

Using the techniques explained herein, embodiments of the invention significantly improve execution time of programs that are execution structure dependent such as Java bytecode programs that rely on a stack-based execution architecture for performance within a computerized device.

Other embodiments of the invention include a computerized device such as a computer system, central processing unit, microprocessor, controller, electronic circuit, application-specific integrated circuit, or other hardware device configured to process all of the method operations disclosed herein as embodiments of the invention. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with a trace code analyzer application that when performed on the processor, produces a trace code analyzer process that causes the computerized device to perform any and/or all of the method embodiments, steps and operations explained herein as embodiments of the invention to allow parallel execution of instructions in a computer program such as a Java application. In other words, a computer, processor or other electronic device that is programmed to operate embodiments of the invention as explained herein is itself considered an embodiment of the invention.

Other arrangements of embodiments of the invention that are disclosed herein include software programs to perform the method embodiment steps and operations summarized above and disclosed in detail herein. As an example, a software application configured to operate as a trace processor as explained herein is considered an embodiment of the invention. The trace processor does not have to be a hardware microprocessor, but can be implemented, for example, within a Java Virtual Machine. More particularly, a computer program product is disclosed which has a computer-readable medium including computer program logic encoded thereon that, when executed on at least one processor with a computerized device, causes the processor to perform the operations (e.g., the methods) indicated herein as embodiments of the invention. Such arrangements of the invention are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computer system, a data processing system or other device to cause the computer system to perform the techniques explained herein as embodiments of the invention including both the trace and trace dependency identification aspects of the invention as well as the runtime scheduling and execution aspects. A Java virtual machine and a Java processor incorporating a trace processor functionality as explained herein are considered embodiments of the invention.

It is to be understood that the system of the invention can be embodied strictly as a software program, as software and hardware, or as hardware or circuitry alone and may be a combination of such elements in a single device or distributed within a system such as a software development or an equivalent system.

BRIEF DESCRIPTION OF THE DRAWINGS

The foregoing and other objects, features and advantages of the invention will be apparent from the following more particular description of preferred embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
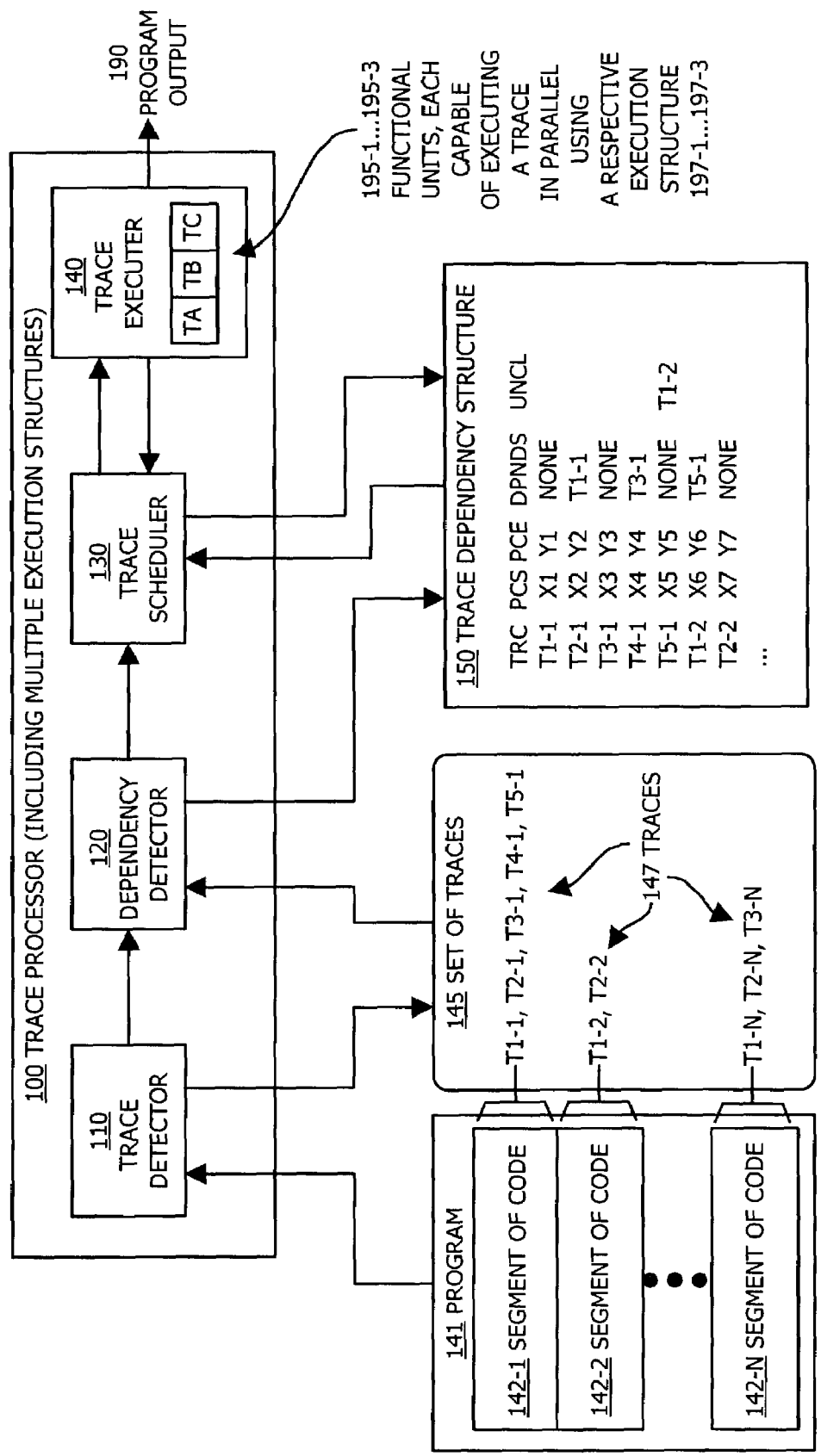
FIG. 1 illustrates an example configuration of a trace processor configured according to one embodiment of the invention.

Embodiments of the invention provide mechanisms and techniques for executing instructions of a software program in parallel when those instructions are performed using an execution structure-based processing paradigm such when a stack-based execution architecture executes Java bytecode instructions. In particular, embodiments of the invention are based in part on an observation that during execution of instructions within a segment of code, there are instances or points in time at which an execution structure such as a stack begins in a clean state and returns to the clean state after execution of a series of instructions. The series of instructions between two clean states of an execution structure such as a stack is referred to herein as a "trace". As an example, consider a Java thread of bytecode instructions that utilize a stack during operation within a Java virtual machine or on a Java processor. Initially, the stack associated with this thread is empty which represents an initial stack clean condition, clean location or clean point. However, during execution of bytecode instructions within the thread, the stack may grow and shrink as the Java virtual machine or Java processor pushes and pops parameters onto and off of the stack. During operation (i.e., execution) of instructions in this manner, there may be situations in which the stack pointer returns to its original clean location (i.e., a subsequent execution structure clean condition). The set of instructions beginning with the first instruction corresponding to the initial, previous or first stack clean condition and up to and including the instruction corresponding to the second stack clean condition represent a single "trace" of instructions according to embodiments of the invention.

Since at the end of a trace, the stack pointer has returned to its initial position, instructions that are subsequently executed from this position and continuing on within the segment of code represent another trace of instructions bounded by the ending of the former trace that serves as a beginning stack clean condition for the next trace. In other words, each trace of instructions is bounded by a stack clean condition and a single stack clean condition can serve as the end of one trace and the next instruction can serve as the beginning of the next trace. As each trace set of instructions is identified, it is assigned a trace number and thus traces identified earlier are considered elder traces of traces identified later within instruction flow of a program.

Embodiments of the invention generally operate to identify a complete set of traces of instructions that exist throughout segments of code within a program such as a Java application. By identifying the set of traces within all segments of code within the program, and since each trace represents a sequence of instructions within a segment of code that are execution structure (i.e., stack) independent from each other, traces that are stack independent from each other. In other words, since the series of instructions in a trace are bounded by stack clean conditions, those instructions do not affect stack contents of other instructions within other traces. Thus there is operation stack dependency for instructions within a single bytecode trace and a single bytecode trace is operation stack independent from other bytecode traces. Embodiments of the invention utilize this observation to provide flexibility of scheduling execution of entire traces (i.e., series of instructions bounded by stack clean points) onto different functional units that each contain respective operand stacks in a trace processor and a trace executer can thus provide parallel or concurrent execution of different traces at the same time.

Identification of traces removes the operation stack dependency between series of instructions within different traces. However, that may be other dependencies that may exist that can restrict the ability to execute traces in parallel. One of such other dependencies is an inter-trace dependency referred to herein as a variable access dependency or data dependency in which one trace accesses variables or data associated with another trace.

Since such data dependencies may exist between traces, after embodiments of the invention operate to identify the set of traces within segments of code in a program, embodiments of the invention then operate to identify a dependency order between traces within the identified set of traces. Generally, the dependency order indicates traces that are dependent upon operation of other traces in the segment of code. This processing involves performing a local variable dependency analysis to identify the dependencies of local variables that can exist across different traces within the set of traces. In particular, to detect inter-trace local variable dependency, every local variable accessing instruction of a trace should be compared with every other elder trace, with respect to trace number. As an example, if a first identified trace references a variable using a write instruction and the second trace uses a read instruction to read that same variable, a read-after-write dependency condition arises and the second trace may be dependent upon the first trace. Embodiments of the invention store this information in a trace dependency structure that may be a table, list, or other data structure in memory. In such cases, embodiments of the invention will ensure that the first trace is scheduled and executed prior of the second trace.

After identifying the set of traces in a program and after identifying the dependency order between traces, embodiments of the invention are capable of executing certain traces within the set of traces in parallel using a trace executer that includes multiple functional units that each maintain separate respective stack for execution of a trace of instructions. In other words, embodiments of the invention provide a trace executer that can support parallel execution of separate traces such that two or more traces can be executed in parallel depending upon the number functional units available, each providing a separate execution structure such as an operand stack. A trace scheduler can utilize the dependency order in order to schedule execution of the traces within the trace executer. If the dependency order indicates, for example, that a second trace is dependent upon a first trace, the trace scheduler can execute these traces on the trace executer such that the first trace is executed prior to the second trace in order to avoid issues associated with the dependencies between those two traces.

As will be explained further, embodiments of the invention also identify situations in which a segment of code such as a basic block or a Java thread ends (e.g., has no more instructions) prior to the occurrence of a stack clean condition in a trace, thus indicating the end of a trace but an unclean stack. Such a condition is referred to herein as a non-clean trace and a non-clean condition. That is, situations may arise in which embodiments of the invention have detected a clean condition indicating the beginning of a trace, and, while attempting to find a subsequent bytecode instruction that corresponds to a subsequent clean condition (to indicate the end of that trace), embodiments of the invention encounter the end of a segment of code such as the end of a Java basic block or the end of the thread. In such cases, embodiments of the invention can indicate that the current trace is a non-clean trace and can end that trace at that instruction (i.e., at the end of the basic block or the end of the thread) and can further indicate that a subsequent trace beginning with the next instruction to which control would be transferred during execution is also a non-clean trace. If the instruction ending the basic block or the thread can transfer to multiple execution locations, such as the beginning of two different threads (i.e., a branch conditional), then each trace created beginning with those two distinct branch locations is also marked as a non-clean trace as well. Embodiments of the invention can up operate to ensure that non-clean traces are all executed using the same execution structure (e.g., operand stack) since non-clean traces are execution structure dependent upon each other when one non-clean trace follows execution of a former non-clean trace.

FIG. 1 illustrates an example of a trace processor 100 configured according to one example embodiment of the invention to trace processor 100 in this example includes a trace detector 110, a dependency detector 120, a trace scheduler 130 and a trace executer 140 that contains a plurality of functional units 195-1 through 195-M (195-3 in this example) that each include an execution structure 197, such as a stack. The operational functionality of each of these components of the trace processor 100 will be explained in more detail herein.

Generally, the trace processor 100 represents either a software program or a hardware instantiation of the functionality explained herein. In particular, at a high-level the trace detector 110 operates to identify a set of traces 145 within segments of code 142 in a software program 141. Once the set of traces 145 is identified, the dependency detector 120 can operate to detect data and local variable dependencies between individual traces 147 within the set of traces 145 and can store this dependency information within a trace dependency structure 150. Once the trace dependencies are identified, the trace scheduler 130 can schedule execution of the individual traces 147 in a parallel manner on the trace executer 140 while accounting for trace dependencies identified within the trace dependency structure 150.

The trace executer 140 provides a plurality of functional units 195 that each represent processing resources required to execute a trace of instructions in parallel with, but independently of other traces that may be concurrently executing in parallel on another functional units 195. Resources of each functional unit include an execution structure 197, such as a stack, that the trace executer 140 can use to store information regarding execution of a sequence of instructions in a trace. The trace executer 140 thus executes the traces 147 in parallel in order to produce program output 190 and uses the respective execution structures 197-1 through 197-3 (three in this example) to execute up to three traces 147 in parallel at one time (three in this example, the actual number of traces that can execute in parallel depends upon the number of functional units having a respective execution structures that the trace processor supports). As traces 147 complete executing in respective functional units 195, the trace executer 140 can provide execution status 185 back to the trace scheduler 130 which can update the trace dependency structure 150 in order to reflect completion of execution of certain traces 147. This execution status information 185 allows the trace scheduler 130 to then schedule subsequent traces 147 for execution in the now free functional unit (free for use by another trace when one trace completes execution). Traces scheduled later for execution may have been dependent upon completion of execution of other traces 147.

For purposes of discussion of example embodiments of the invention, the instructions within segments of code 142 are Java bytecode instructions and each segment of code 142 is a sequence of Java bytecode instructions that form, for example, either a Java basic block or a Java thread within a Java program. In addition, each functional unit 195 includes a respective execution structure 197 that in this example is an operand stack execution structure that the multiple execution structure trace processor 100 uses to perform the Java bytecode instructions in parallel by executing multiple traces 147 at the same time. Each trace 147 in the set of traces 145 is a sequence of Java bytecode instructions that are operand stack independent from a remainder of Java bytecode in that segment of code 142.

Further details of processing operations performed according to embodiments of the invention will be described next with respect to the flow chart of processing steps illustrated in FIG. 2. During the discussion of processing steps within the flow charts that follow, specific examples will be provided with respect to identification of traces 147 using example Java software code and with respect to identification of example dependencies between those traces 147 in order to assist in describing and understanding embodiments of the invention. It is to be understood that these examples are not intended to be limiting of embodiments of the invention, nor is the architecture of the trace processor 100 illustrated in FIG. 1 intended to be limiting to embodiments of the invention.

Figure 2:
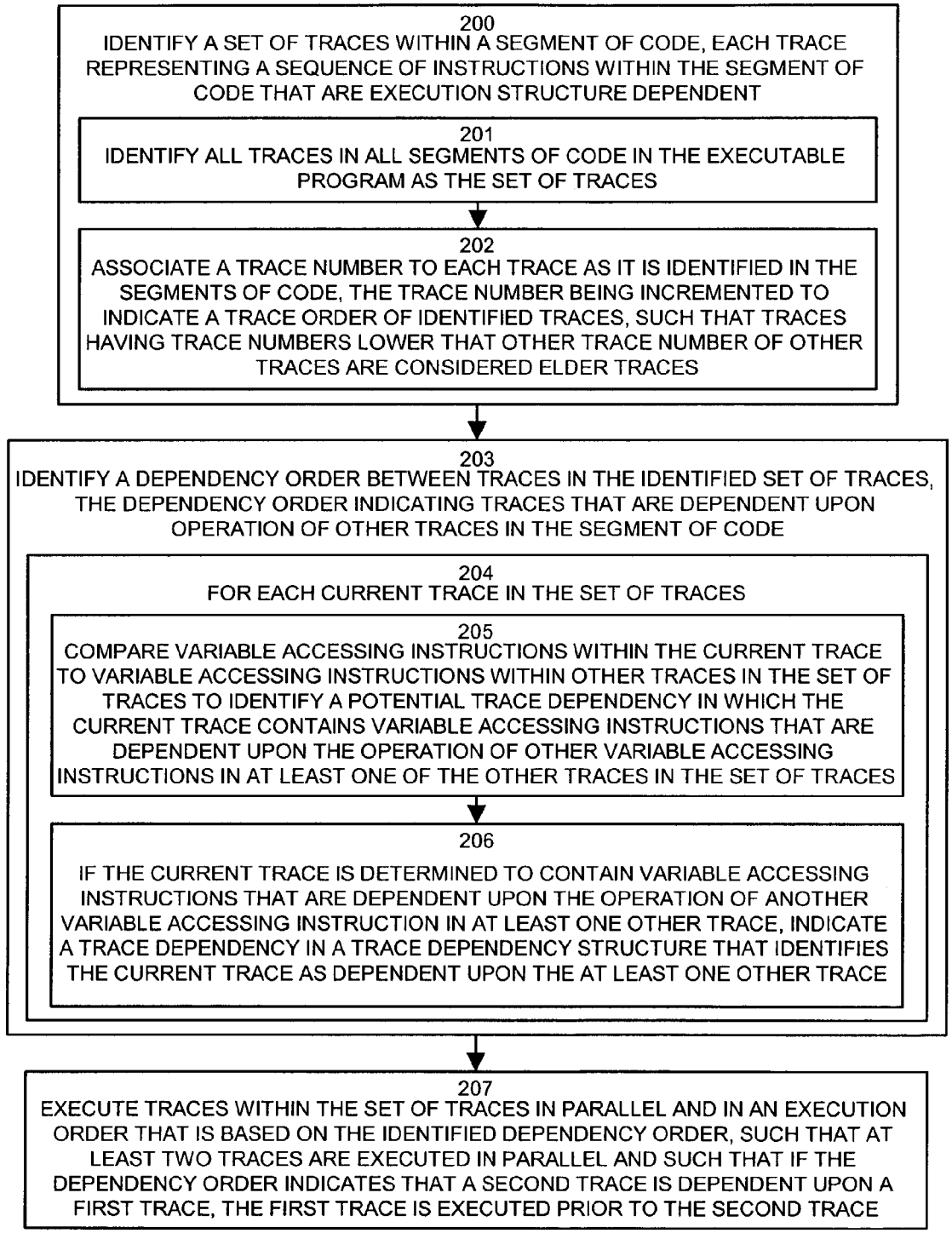
FIG. 2 is a flow chart of processing steps to the trace processor performs according to high-level operations of embodiments of the invention.

FIG. 2 is a flow chart of processing operations performed according to embodiments of the invention to allow execution of instructions in parallel for a software program. Generally, the processing operations illustrated in the flow chart in FIG. 2 are performed by components of the trace processor 100 shown, for example, by the example architecture illustrated in FIG. 1 and discussed briefly above.

In step 200, the trace processor 100 generally operates the trace detector 110 to identify a set of traces 145 within a segment of code 142. Each trace 147 represents a sequence of instructions such as Java bytecode within the segment of code 142 that are execution structure dependent upon each other and that are execution structure independent from other series of instructions represented by other traces 147.

As shown in sub-step 201, the trace detector 110 can identify all traces in all segments of code 142-1 through 142-N in the executable program 141 as the set of traces 145.

As shown in sub-step 202, the trace detector 110 can associate a trace number to each trace as it is identified in the segments of code 142 (e.g., traces T1-1, T2-1 . . . T2-1, T1-2, T2-2, . . . and so forth). The trace number is incremented to indicate a trace order of identified traces 147. Traces having trace numbers lower than other trace numbers are considered elder traces. Trace order will be important and will be explained in detail when discussing detection of data dependencies between traces 147.

Prior to the completion of discussion of steps 203 through 207 in the flow chart in FIG. 2, an example of a sample trace identification process as applied to a hypothetical segment of code will now be provided along with a discussion of details of processing operations performed according to certain embodiments of the invention to identify traces 147 within segments of code 142. In other words, prior to discussing steps 203 through 207 in FIG. 2, details of processing operations associated with step 200 as performed by the trace detector 110 operating within trace processor 100 in FIG. 1 will now be explained.

Assume for this example that the trace processor 100 is a stack-based Java machine (e.g., a JVM or a Java processor) that can perform or execute traces 147 of Java instructions in parallel with each other to speed-up overall execution of the Java program 141. During typical execution or performance of Java bytecode instructions, all the operands are moved on top of an execution structure, which in this example is an operand stack, before they are executed. During the processing of the bytecodes, the operand stack execution structure therefore grows and shrinks. When there are no operands in the operand stack execution structure, it is said to be "clean", which is referred to herein as a "clean condition" of the execution structure 197. A sequence of bytecode instructions that lie or exist between execution structure clean points is a bytecode trace or simply a trace 147. There is operand stack execution structure dependency between the bytecodes of a trace 147 since the stack is unclean within a trace 147, but a trace 147 is operand stack execution structure independent from other traces 147 in the set of traces 145, since each trace is separated from former and subsequent traces by an operand stack clean point. Embodiments of the invention recognize this situation and provide flexibility to schedule multiple traces 147 for parallel execution within different operand stack execution structures 197 in each functional unit 195. Thus, a bytecode trace 147 could be defined as the sequence of Java bytecodes, which are operand stack-independent from the rest of the bytecodes of a basic block or of a thread. An example that follows will illustrate this concept of embodiments of the invention further.

The following example segment of Java software code is taken from a program called "compress" that exists within a SPECjvm'98 benchmark:

```
public void compress( ) {
    int fcode;
    int i = 0;
    int c;
    int ent;
    int disp;
    int hsize_reg;
    int hshift;
    <skip>
    while ( (c = Input.getbyte( ) ) != -1) {
        in_count++;
        fcode = (((int) c << maxbits) + ent);
```

-continued

```
                    /* xor hashing */
            i = ((c << hshift) ^ ent);
            int temphtab = htab.of (i);
            if ( htab.of (i) == fcode ) {
               . . .
}
```

Upon compiling the above Java code example, a Java compiler produces a series of Java bytecode instructions. If those Java bytecode instructions were executed within a single-operand stack execution structure Java virtual machine, the operand stack execution structure would grow in shrink as required. The following table illustrates the Java bytecode instructions (produced a result of compiling the above example of Java code) and their corresponding program counter (PC) locations, the contents of the operand stack execution structure as is exists during simulated execution of those instructions, the beginning and ending of six respective traces 147 that the trace detector 110 identifies within the Java bytecode, as well as the Java code equivalent instruction from the code example above:

bytecode is encountered, the trace detector simulates its execution and stack growth or shrink is calculated. At the detection of another stack clean point, the trace detector again marks the PC location of the most recently simulated instruction, which is the end PC of a trace. The above procedure is repeated until all the traces are identified in a basic block.

In the trace examples shown above, the bytecode, which moves the operand(s) in to the clean operand stack execution structure 197 becomes the first bytecode of a trace. The bytecode, which moves out the operand(s) to make the operand stack execution structure 197 clean again is the last bytecode of a trace. The Java bytecode "iinc" instruction is a special Java instruction that does not operate on top of the operand stack execution structure 197 but instead operates on the local variable itself. In the case of this instruction, the operand from the local variable is moved to the adder unit to perform an increment operation and a result is placed back to the same local variable slot in the local variable stack. Thus the "iinc" instruction is opstack-independent and therefore is a trace by itself. By reviewing the above example, it

TABLE ILLUSTRATING TRACE IDENTIFICATION

| PC:Java bytecode | Operand stack Execution struct. contents and (Stack Depth) | Traces identified including beginning and end of each trace | Java Code Equivalent |
|---|---|---|---|
| 72:aload_0 | SP (1) | Trace 1 begin | |
| 73:dup | SP+=1 (2) | | |
| 74:getfield #31 | SP-=1, SP+=1 (2) | | in_count ++ |
| 77:iconst_1 | SP+= 1 (3) | | |
| 78:iadd | SP-=2, SP+=1 (2) | | |
| 79:putfield #31 | SP-=2 (0) | Trace 1 end | |
| 82:iload_3 | SP (1) | Trace 2 begin | |
| 83:aload_0 | SP+=1 (2) | | |
| 84:getfield #34 | SP-=1, SP+=1 (2) | | fcode = |
| 87:ishl | SP-=2, SP+=1 (1) | | (((int) c << maxbits) + ent); |
| 88:iload #4 | SP+=1 (2) | | |
| 90:iadd | SP-=2, SP+=1 (1) | | |
| 91:istore_1 | SP-=1 (0) | Trace 2 end | |
| 92:iload_3 | SP (1) | Trace 3 begin | |
| 93:iload #7 | SP+=1 (2) | | |
| 95:ishl | SP-=2, SP+=1 (1) | | i = ((c << hshift) ^ ent); |
| 96:iload #4 | SP+=1 (2) | | |
| 98:ixor | SP-=2, SP+=1 (1) | | |
| 99:istore_2 | SP-=1 (0) | Trace 3 end | |
| 100:aload_0 | SP (1) | Trace 4 begin | |
| 101:getfield #30 | SP-=1, SP+=1 (1) | | htab (loaded into a local |
| 104:astore #8 | SP-=1 (0) | Trace 4 end | variable reg.) |
| 106:aload #8 | SP (1) | Trace 5 begin | |
| 108:getfield #47 | SP-=1, SP+-1 (1) | | |
| 111:iload_2 | SP+=1 (2) | | temphtab htab.of(l) |
| 112:iaload | SP-=2, SP+=1 (1) | | |
| 113:istore #8 | SP-=1 (0) | Trace 5 end | |
| 115:iload #8 | SP (1) | Trace 6 begin | |
| 117:iload_1 | SP+=1 (2) | | if(temphtab == fcode) |
| 118:if_icmpne 134 | SP-=2 (0) | Trace 6 end | |

According to embodiments of the invention, the trace detector 110 parses, analyzes, or otherwise simulates execution (e.g., and thus determines stack operations) of the above Java bytecode to identify six different trace constructions from as shown in the above table, with identifying stack clean points and stack-depth calculations for every instruction. Initially, the first stack clean point is identified and the PC is marked, which is the start PC of the first trace. As each can be seen how embodiments of the invention can identify traces based on operand stack clean locations or clean conditions.

Figure 3:
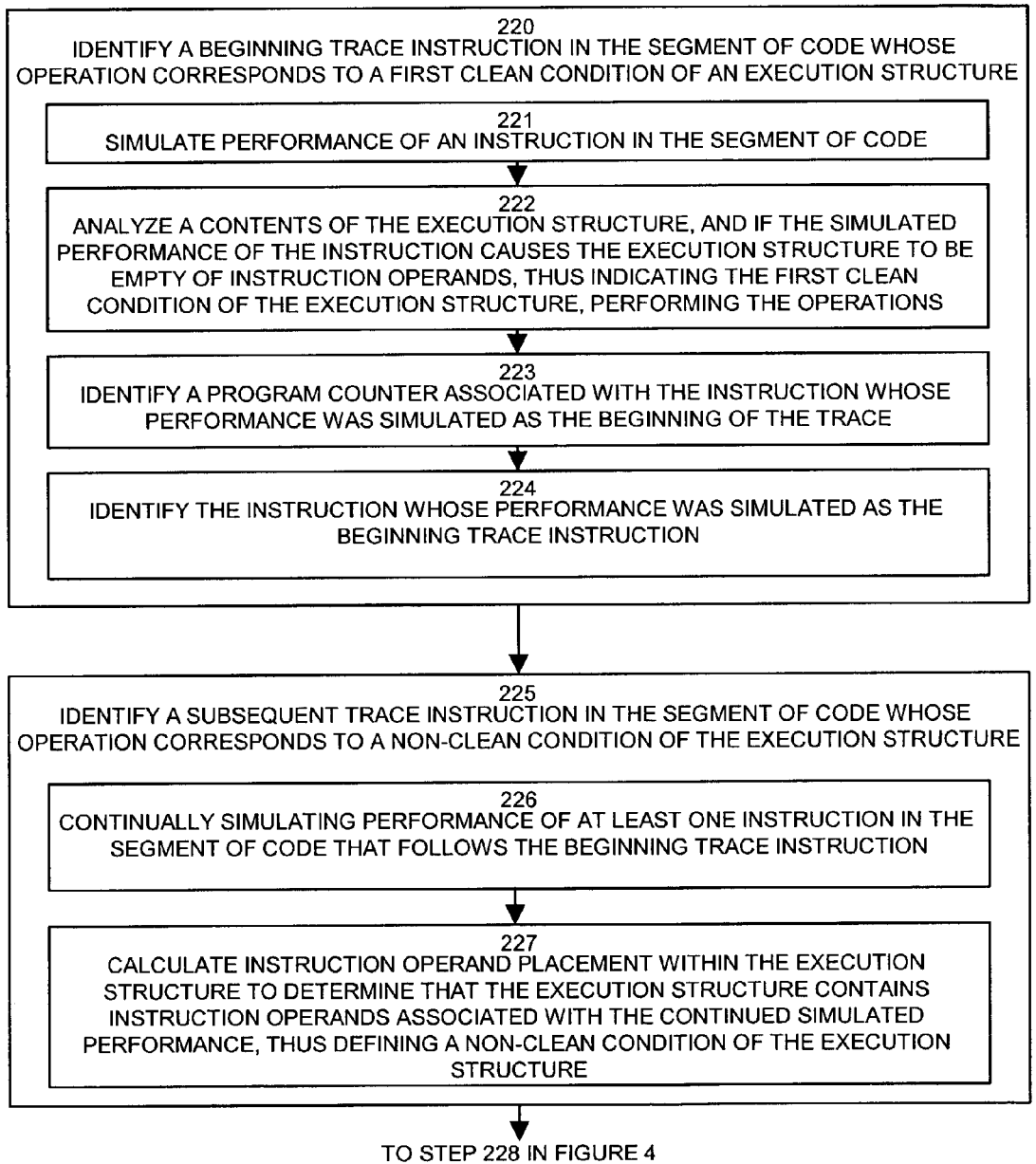
FIGS. 3 and 4 are a flow chart of processing steps to identify a set of traces within a segment of code in accordance with one example embodiment of the invention.
Figure 4:
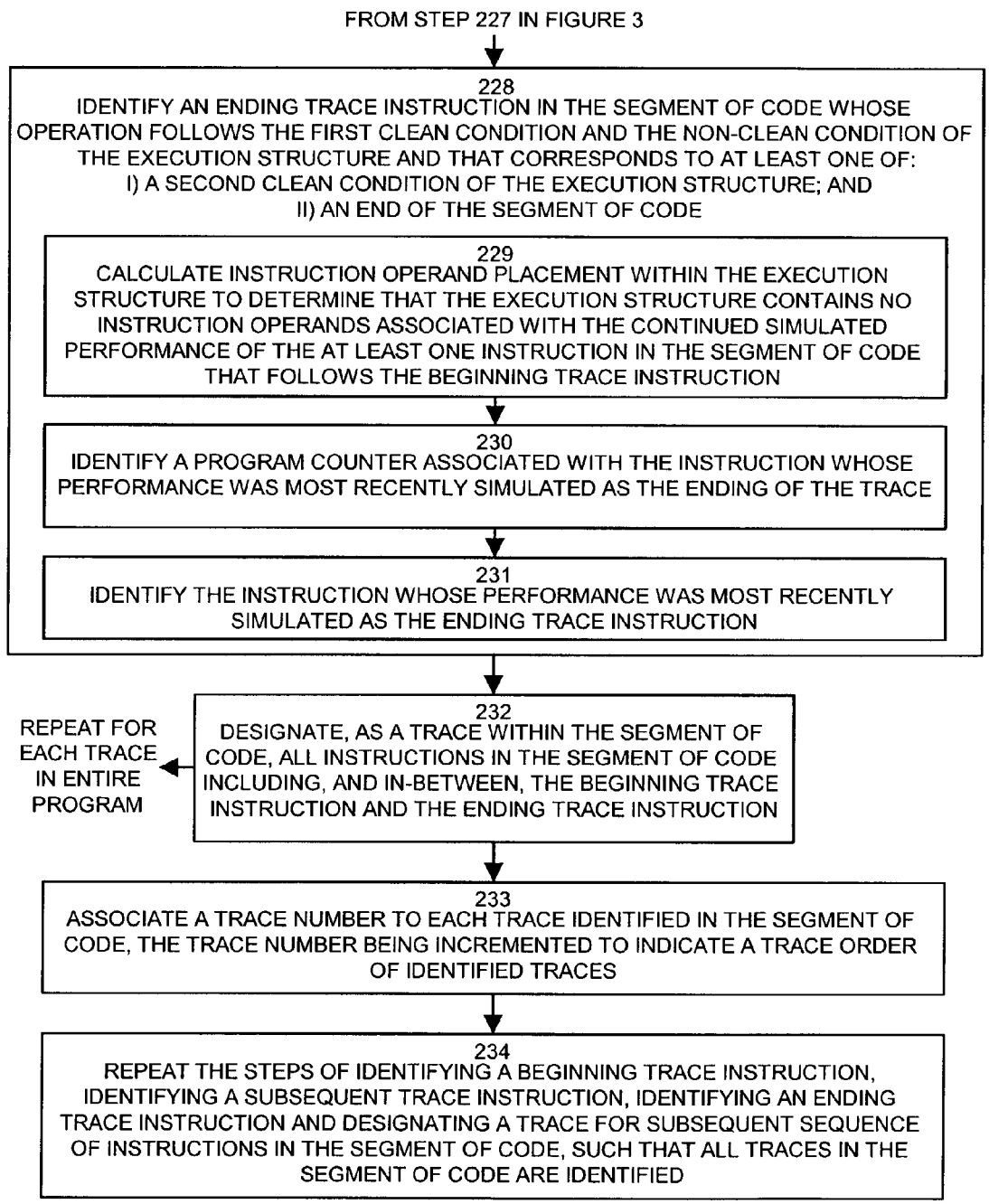

FIGS. 3 and 4 are a flow chart of processing steps that illustrate processing operations performed according to one example embodiment of the invention by (or within) an event detector 110 in a trace processor 100 to identify a set of traces 145 within a segment of code 142 in a program 141.

In step 220, the trace detector 110 identifies a beginning trace instruction in the segment of code whose operation corresponds to a first clean condition of an execution structure.

To perform step 220, in sub-step 221 the trace detector 110 simulates performance of an instruction in the segment of code. By simulating performance, what is meant is that the trace detector 110 can use knowledge of how instructions in the segment of code would effect the execution structure 197 such as a stack if they were to be executed at runtime. It is to be understood that simulated performance of an instruction does not require that the instruction be fully executed but rather, involves the trace detector 110 being able to determine what the contents of the execution structure such as a stack would be if a particular instruction were to execute.

During simulated performance, in step 220 to the trace detector 210 can analyze the contents of the execution structure such as the operand stack. If just prior to the simulated performance of the instruction, the execution structure is empty of instruction operands, this indicates the first clean condition of the execution structure and the trace detector 110 performs the operations of substance 223 and 224.

In step 223, the trace detector 110 identifies a program counter (PC) associated with the instruction whose performance is to be simulated as the beginning of the trace 147.

In step 224 the trace detector 110 identifies the instruction whose performance is to be simulated as the beginning trace instruction.

Next, in step 225 the trace detector 110 identifies a subsequent trace instruction in the segment of code whose operation corresponds to a non-clean condition of the execution structure.

To do so, as shown in sub-step 226 the trace detector 110 "continually" simulates performance of at least one instruction in the segment of code 142 that follows the beginning trace instruction.

In step 227, as a check after simulated performance of each instruction in the segment of code that follows the beginning trace instruction, the trace detector 110 calculates instruction operand placement within the execution structure (e.g., within the stack) to determine that the execution structure 197 contains instruction operands associated with the continued simulated performance, thus defining a non-clean condition of the execution structure 197. Calculation of instruction operand placement came comprise tracking conditions and removals to and from the operand stack execution structure 197 to determine if it has returned to a clean point.

Next, in step 228 the trace detector identifies an ending trace instruction in the segment of code 142 whose operation follows the first clean condition and the non-clean condition of the execution structure 197. The ending trace instruction corresponds to either a second clean condition of the execution structure for the segment of code (e.g., the end of a basic block or the end of the thread) or transfer of control to a new execution point that does not follow the current instruction. That is, the ending trace instruction is either the instruction whose simulated execution causes the operand stack execution structure 197 to return to the former clean condition or causes transfer of control out of the basic block or is otherwise the end of the segment of code 142.

In sub-step 229, after simulated performance of one or more instructions in the segment of code that follows the beginning trace instruction, to identify the ending trace instruction the trace detector 110 calculates instruction operand placement within the execution structure 197 to determine that the execution structure 197 contains no instruction operands associated with the continued simulated performance of an instruction in the segment of code 142 that follows the beginning trace instruction. In other words, to detect the ending trace instruction that follows the beginning trace instruction, the trace detector 110 detects when the execution structure such as the stack is again empty or clean.

In addition, in sub-step 230 the trace detector 110 identifies a program counter (PC) associated with the instruction whose performance was most recently simulated as the ending of the trace 147.

In step 331 the trace detector 110 identifies the instruction whose performance was most recently simulated as the ending trace instruction.

Next, in step 232 the trace detector 110 designates, as a trace 147 within the segment of code 142, all instructions in the segment of code including, and in-between, the beginning trace instruction and the ending trace instruction. By designating a trace, what is meant is that the trace detector 110 can specify all parameters associated with the trace including the beginning in ending of the trace as identified by the program counter of beginning in ending instructions associated with the trace, an identity of the thread or basic block in which this trace was identified, and any other information that may be relevant to the trace 147, such as the number of instructions in the trace or the like. Information concerning particular identified traces 147 may be stored, for example, within a single structure such as the trace dependency structure 150 or a basic block trace table which contains trace identification information as well as trace dependency information. That is, it is to be understood that the illustration FIG. 1 of the set of traces 145 being separately shown from the trace dependency structure 150 is provided for ease of understanding embodiments of the invention and is not meant to be limiting. In this manner, by simulating execution of the bytecode instructions in a segment of code 142, the trace detector 110 can identify all traces 147 within the segment of code 142.

Next, in step 233 the trace detector 110 associates a trace number to each trace 147 identified in the segment of code 142. The trace number is incremented to indicate a trace order of identified traces and may be stored in a basic block trace table or other structure such as the trace dependency structure 150. As will be explained shortly, the trace dependency detector 120 can utilize numbering of traces during detection of data dependencies between traces 147 such that if a lower numbered trace contains variable references to a variable within a higher numbered trace, the higher numbered trace will be considered to be a dependent upon the lower numbered trace and will be scheduled for execution thereafter.

Finally, in step 234 the trace detector 110 repeats the steps of identifying a beginning trace instruction, identifying a subsequent trace instruction, identifying an ending trace instruction and designating a trace for subsequent sequences of instructions in the segment of code 142 such that all traces in the segment of code are identified. This processing can be repeated for all segments of code within the program 141 in order to identify a complete set of traces 145.

In one embodiment of the invention, the execution structure 197 is a stack and the operation explained above of calculating instruction operand placement within the execution structure comprises calculating stack growth and/or stack shrinkage of instruction operands with the stack as a result of simulated execution of instructions. In such cases, the beginning trace instruction corresponds to an instruction for which simulated execution caused the stack to grow from the clean condition to the non-clean condition and the ending trace instruction corresponds to an instruction for which simulated execution caused the stack to grow from the non-clean condition to the clean condition. In this case, the trace defines a continuous sequence of instructions from the beginning trace instruction to the ending trace instruction during which simulated execution causes the stack to contain at least one operand associated with trace instructions whose execution was simulated.

It is noted that in there can be multiple traces within a segment of code 142 such as a basic block, and that a trace and the segment of code 142 (e.g., a basic block) could be the same, and in few rare cases, a trace 147 can extend beyond the end of a segment of code 142, such as by extending beyond the end of a basic block. As an example, if the end of a trace 147 in one segment of code 142-1 is not a control transfer instruction, then the trace 147 may end in any one of the next segments of code 142-2, 142-3 or the like (i.e., in another basic block), that each may be a primary or alternate basic block, depending on the path the execution control takes. When the trace continues beyond the end of a basic block, it is referred to as an unclean trace and the point of execution control after an instruction that end and unclean trace began the new trace which is also considered an unclean trace. Unclean traces can be illustrated in the following example:

Example of Un-clean traces

| Basic block#: trace# | Bytecode sequence | Comments |
|---|---|---|
| bb1: t1 | b1: iload x | |
| | b2: iload y | |
| | b3: ifeq b8 | bb1 ends; t1 ends incompletly |
| bb2: t2 | b4: iload y | next primary BB (of bb1) starts |
| | b5: idiv | |
| | b6: istore z | end of trace t1 (complete) |
| | b7: goto b11 | |
| bb3: t3 | b8: iconst__1 | next secondary BB (of bb1) starts |
| | b9: idiv | |
| | b10: istore z | end of trace t1 (complete) |

In the above example, if a control transfer takes place from instruction b3 to b8, then the incomplete trace t1 of basic block 1 and the incomplete trace t3 of the basic block 3 should be scheduled to execute on the same stack. A difficulty with such a trace is that operation stack dependency is imposed across the basic block. Embodiments of the invention handle this situation by splitting the trace into three traces, as shown in this example, and by marking each trace in the trace dependency structure 150 as non-clean or unclean-stack trace (in the "UNCL" column in FIG. 1, representing an Unclean Trace). It is then left to the trace scheduler 130 that schedules execution of bytecode traces to schedule each of these traces 1, 2 or 3 on the same operand stack execution structure. The bytecode-trace scheduling logic in the trace scheduler 130 schedules execution of such incomplete trace sequences on the same stack by recognizing their status as "unclean" in the UNCL column of the trace dependency structure 150. To this end, the trace scheduler 130 will schedule either [T1 and T3] or [T1 and T2] on the same execution structure 197. It is noted herein that from a review of Java bytecode in SPECjvm98 benchmark applications, almost all-basic blocks (more than 95%) start and end with a stack clean point. This implies that the only traces of a basic block that do not end with a stack clean point are those that extend beyond the basic block. Because there are not many of such traces in Java applications, they may be serialized and held to execution in the same operand stack execution structure (as opposed to being executed in parallel on different stacks) without much performance penalty.

Figure 5:
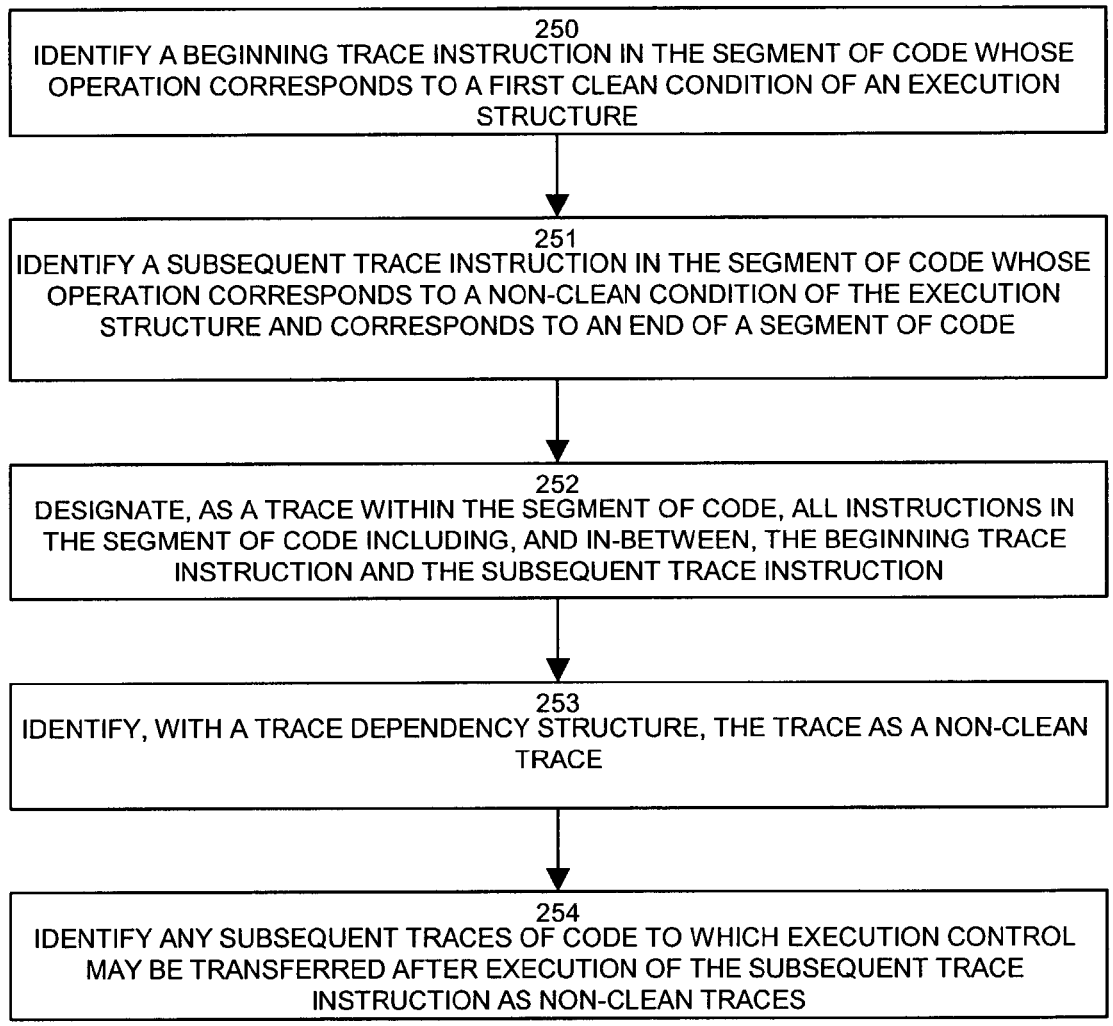
FIG. 5 is a flow chart of processing steps to detect unclean traces within segments of code in accordance with one example embodiment of the invention.

FIG. 5 is a flow chart of processing operations performed by a trace detector 110 configured in accordance with one example embodiment of the invention in order to identify unclean traces 147 within a segment of code that are non-clean as explained in the above example.

In step 250 the trace detector 110 identifies the beginning trace instruction in the segment of code 142 whose operation corresponds to a first clean condition of an execution structure 197 such as a stack.

Next, in step 251 the trace detector 110 identifies a subsequent trace instruction in the segment of code whose operation corresponds to a non-clean condition of the execution structure and corresponds to an end of a segment of code. In other words, in step 251, during simulated execution of instructions, the trace detector 110 encounters a trace instruction that corresponds to an end of a segment of code (i.e., either a branch point for the end of a basic block) and is thus a non-clean condition for that trace 147. The end of the segment of code is identified according to these example embodiments of the invention as either an end of a basic block, a transfer of control from the ending trace instruction to an instruction that does not immediately follow the ending trace instruction, or a transfer of control from the ending trace instruction of a first trace to a beginning trace instruction of a second trace.

Next, in response to detecting the non-clean condition, in step 252 the trace detector 110 designates, as a trace 147 within the segment of code 142, all instructions in the segment of code 142 including, and in-between, the beginning trace instruction and the subsequent trace instruction that caused the non-clean condition. In other words, this non-clean trace 147 includes the beginning trace instruction and any simulated instructions up to and including the instruction that caused the occurrence of the non-clean condition.

Next, in step 253 and trace detector 110 identifies, within the trace dependency structure 150, the trace 147 as a non-clean trace. This is illustrated in the example in FIG. 1 in the "UNCL" column of the trace dependency structure 150. In the example, the trace T5-1 is unclean and control was transferred to the trace T1-2, which is also considered unclean. As will be explained, the trace scheduler 130 can ensure that traces that are unclean and that reference each other in the unclean column of the trace dependency structure 150 are executed using the same operand stack execution structure 197 within the trace executer 140.

In step 254 the trace detector 110 identifies any subsequent traces of code (e.g., 147-A, 147-B, and so forth) to which execution control may be transferred after execution of the subsequent trace instruction as non-clean traces as well. In this manner, the trace dependency structure 150 can identify a group of related unclean traces.

At this point in processing, the trace detector 110 has identified entire set of traces 145 within segment of code 142 in a program 141 such as a Java application that he's been compiled into bite code. After all the traces 147 have been identified, the trace processor operates the dependency detector 120 to identify the dependency order between individual traces 147 within the set of identified traces 145.

Returning attention to the flow chart of processing steps FIG. 2 and specifically to step 203, in step 203 the trace processor 100 operates the dependency detector 120 to identify a dependency order (e.g., within the trace dependency structure 150) between traces 147 in the identified set of traces 145. The dependency order indicates traces that are dependent upon operation of other traces in the segment of code 142 (or the entire program 141 in this example). Generally, the processing to identify dependency order between traces 147 in the set of traces 145 is shown in FIG. 2 by sub-steps 204 through 206.

In step 204, the dependency detector 120 inches a processing loop that occurs for each current trace 147 existing within the set of identified traces 145.

Within the processing loop defined by step 204, in step 205 the dependency detector 120 compares variable accessing instructions within the current trace 147 (i.e., bite code instructions in the current trace) to variable accessing instructions within other traces 147 in the set of traces 145 to identify potential trace dependencies in which the current trace contains variable accessing instructions (e.g., a bite code instructions) that are dependent upon the operation of other variable accessing instructions (i.e., other bite code instructions) in the at least one of the other traces 147 in the set of traces 145.

In one embodiment of the invention the potential trace dependencies include either a read-after-write variable dependency, a write-after-read variable dependency, and/or a write-after-write variable dependency between a variable accessing instruction in the current trace and at least one other variable accessing instruction in the at least one other trace in the set of traces 145 (with respect to elder traces, as will be explained). That is, the dependency detector 120 can detect variables that have these types of dependency relationships.

In one embodiment of the invention, when comparing variable accessing instructions within the current trace to variable accessing instructions within other traces in the set of traces, the dependency detector 120 only compares variable accessing instructions within the current trace to variable accessing instructions within other traces having a trace number that is lower that the current trace number, such that the current trace is only compared for dependency order to other traces that are elder traces to the current trace. In other words, in the processing operation defined in the processing loop of step 204 to compare variable accessing instructions in one trace to variable accessing instructions in another trace to detect the dependencies between these traces, only traces having a lower trace number and that could possibly execute prior to the current trace are compared for variable dependencies with the current trace.

In step 206 the dependency detector 120 determines if the current trace contains a variable accessing instruction that is dependent upon the operation of another variable accessing instruction in another trace and if so, indicates the trace dependency in the trace dependency structure 150 that identifies the current trace as being dependent upon the other trace. As illustrated in FIG. 1, the trace dependency structure 150 can be a table, list or other such structure that contains a list of traces along with beginning in ending program counters of those traces. The dependency column labeled "DPNDS" indicates identities of other traces upon which the trace identified by this row in the trace dependency structure 150 depends. As an example, considering the five example traces T1-1 through T5-1 of the segment of code 142-1 shown in FIG. 1, trace T2-1 is dependent upon trace T1-1 and trace T4-1 is dependent upon trace T3-1 for execution. This means that of the five traces identified within the segment of code 142-1, traces T1-1, T3-1 and T5-1 could each be executed in parallel within the trace processor 100 since none of these three traces is dependent upon any other trace for execution. However, since trace T2-1 is dependent upon trace T1-1 for execution, trace T2-1 must at least wait until trace T1-1 has completed execution before the trace scheduler 130 can schedule trace T2-1 for execution. Note that while trace T5-1 is not dependent upon another trace for execution, this trace is marked as an unclean trace with respect to another trace T1-2, and thus when the trace scheduler 130 executes trace T5-1 any particular functional unit 195 containing a respective operand stack execution structure 197, the trace scheduler 130 will also have to execute trace T1-2 on this same stack without first executing any other trace before or after trace T5-1. Stated generally, when the trace is marked as "unclean," the trace detector 110 will have marked subsequent execution points to which transfer of control is sent from the ending of the unclean trace as beginning trace instructions that are also unclean traces. When a trace is "unclean" the trace detector 110 can mark (e.g., within the trace dependency structure 150 or another structure such as a basic block trace table) that trace as well as the other unclean traces (i.e., traces to which control could be transferred to the first unclean trace) as a related group of traces such that when the trace scheduler 130 executes one unclean trace, at the ending trace instruction in this trace at the point of transfer of control to the beginning instruction of the next trace (i.e., that is also unclean since the stack is not empty), that next trace will also be marked as unclean. This is because the simulated execution takes place using a single stack and since the former trace ended prior to a stack clean point, the stack will have information related to execution of instructions in the former trace at the beginning or first instruction of the next trace. Accordingly, during execution the trace scheduler 130 can instruct the trace executor 140 to not clear the execution structure stack 197 for the first unclean trace when he completes such so that it can subsequently schedule and execute the next or second unclean trace that can continue execution using this execution stack structure 197 in the same functional unit 195 as the prior unclean trace which preceded it and is now complete. In this manner, since two unclean traces execute one after another on the same execution structure 197 that has not been cleared of any values, any data dependencies and stack dependencies between these traces will be preserved by embodiments of the invention.

Upon completion of step 206, the dependency detector 120 has detected all dependencies and the set of traces 145 in processing can proceed to step 207 in FIG. 2.

Returning attention to FIG. 2, in step 207 the trace processor 100 operates the trace scheduler 130 in conjunction with the trace executer 140 to schedule and execute traces 147 within the set of traces 145 in parallel with each other an execution order that is based upon the identified dependency order 150, such that at least two traces 147 (e.g., T1-1 and T1-3 in FIG. 1) are executed in parallel (e.g., within respective functional unit 195 in the trace executer 140) and such that if the dependency order 150 indicates that a second trace 147-1 (e.g., T1-2) is dependent upon a first trace 147-2 (e.g., T1-1), the first trace 147-2 (e.g., T1-1) is executed prior to the second trace 147-1 (e.g., T1-2). Accordingly, by executing the traces in parallel according to the dependencies 150, embodiments of the invention can significantly enhance execution speed of a program such as a job application.

Figure 6:
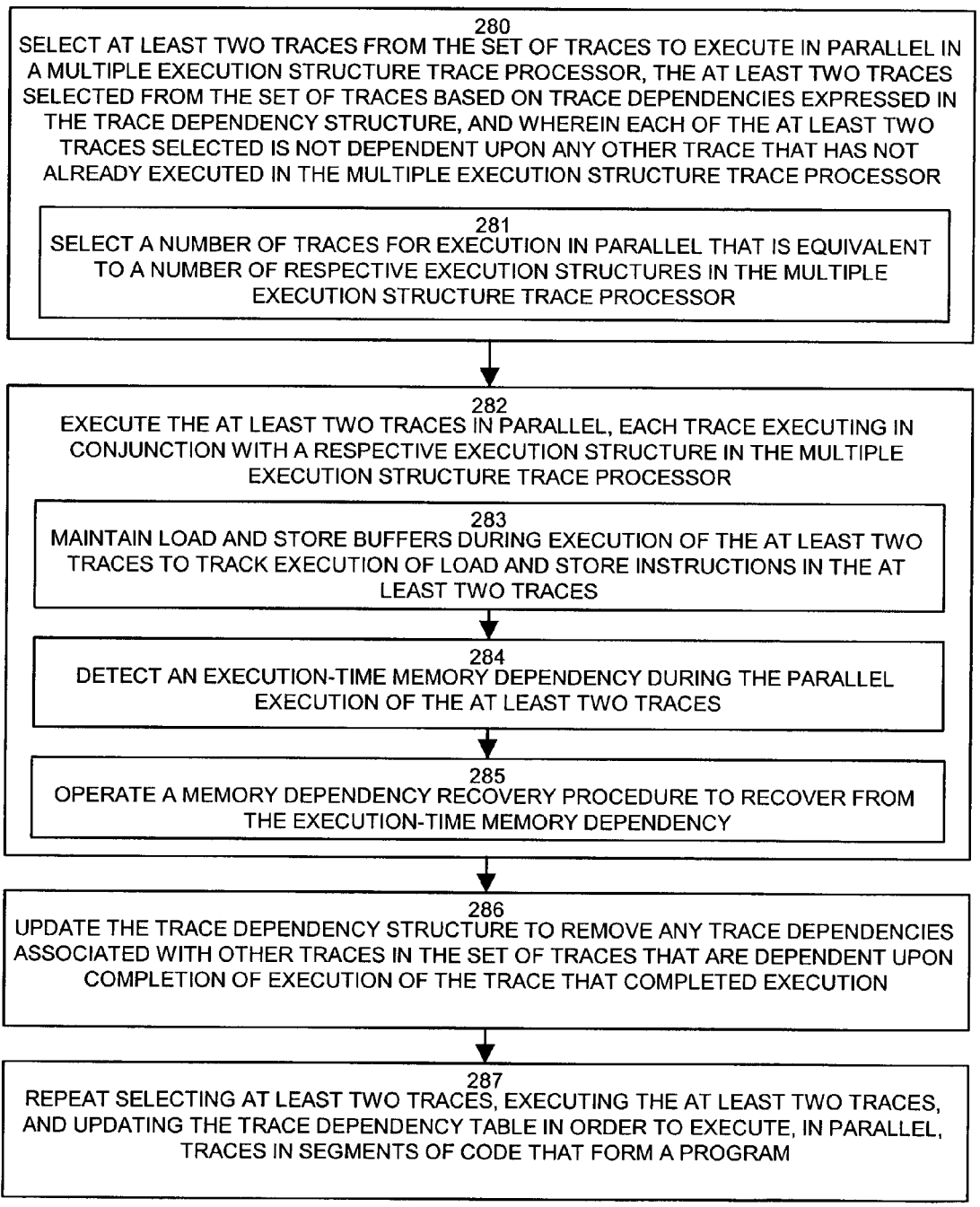
FIG. 6 is a flow chart of processing steps to execute traces in parallel according to an execution order based upon identified dependencies between traces in accordance with one example embodiment of the invention.

FIG. 6 is a flow chart of processing steps that illustrates details of processing performed by a trace scheduler 130 and a trace executer 140 operating within the trace processor 100 in accordance with one example embodiment of the invention in order to schedule and execute traces 147 in parallel based upon the dependency order specified in the trace dependency structure 150.

In step 280 the trace scheduler 130 selects at least two traces (e.g., T1-1 and T3-1 in FIG. 1) from the set of traces 145 to execute in parallel in a multiple execution structure trace processor (e.g., within respective functional units 195-1 and 195-2, each containing a respective execution structure such as a stack 197-1 and 197-2). The traces selected from the set of traces 145 for execution are based on trace dependencies expressed in the trace dependency structure 150. In addition, the selected traces are not dependent upon any other trace that has not already executed in the trace processor 100.

In sub-step 281, the trace scheduler 130 selects a number of traces for execution in parallel that is equivalent to a number of respective execution structures 197-1 . . . 197-X (and corresponding functional units 195) in the multiple execution structure trace processor 100 (i.e., within respective functional units 195).

In step 282 the trace schedule or 130 causes the trace executer 140 to load and execute the selected traces 147 in parallel, with each trace executing in conjunction with a respective execution structure 197 in the multiple execution structure trace processor 100.

In step 283 the trace executer 140 maintains load and store buffers during execution of the traces to track execution of load and store instructions in executing traces in the event of the memory dependency occurring during execution.

In step 284 the trace executer 140 to detects an execution-time memory dependency during the parallel execution of the traces.

In step 285, in response, the trace executer 140 operates a memory dependency recovery procedure to recover from the execution-time memory dependency.

In step 286 the trace scheduler 130 updates the trace dependency structure 150 to remove any trace dependencies associated with other traces in the set of traces that are dependent upon completion of execution of the trace that completed execution. In this manner, if a trace in the trace dependency structure 150 is dependent upon another trace, when the other trace complete execution, the dependency can be removed such that the trace scheduler 130 can recognize that the other trace it was formerly dependent upon the now executed trace is now available for scheduling execution since the dependency is no longer present.

In step 287 the trace scheduler 130 and trace executer 140 repeats the processing of step 280 through 282 in order to execute traces in parallel while updating the trace dependency structure 150 with execution state information 185 about traces that have completed execution. In other words, as the execution scheduler 130 selects traces 147 for execution based on the trace dependency structure 150, when the trace executer 140 completes execution of two or more concurrently executing traces in respective functional units 195 having respective execution structures, such as a stacks 197, upon completion of execution of each trace, the trace executer 150 can provide execution state information 185 back to the trace scheduler 130 which can update dependency information within the trace dependency structure 150.

In this manner, embodiments of the invention accomplish parallel execution of traces within a trace processor 100 in order to significantly decreased execution time of an application such as a Java program. It is to be understood that the example illustrated in FIG. 1 only shows three functional units 195, each of which represents the resources required to execute a particular traces and includes an execution structure 197 such as a stack. If additional functional units 195 are included within the trace executer 140, more than three traces 147 can be executed in parallel as well. Also, an architecture providing to two functional units 195 would allow execution of two parallel traces at the same time.

Those skilled in the art will understand that there can be many variations made to the embodiments explained above while still achieving the same objective of those embodiments and the invention in general. The scope of this invention is intended to cover such variations. As such, the foregoing description of embodiments of the invention is not intended to be limiting. In particular, the attached Appendix contains the following two papers:

"Bytecode Traces: Exploiting Java-ILP"

and

"Exploiting Java-ILP on a Simultaneous Multi-Trace Instruction Issue (SMTI) Processor"

These papers explain examples of alternative embodiments and configurations of the invention. The disclosure and teachings of these two papers is considered part of the disclosure of the present invention and the contents of these papers are incorporated herein by reference.

Bytecode traces: Exploiting Java-ILP

Abstract

We propose a novel technique to exploit Instruction Level Parallelism (ILP) in Java bytecodes. The basis of the technique is a bytecode trace, which is a dynamic sequence of Java bytecodes consisting of stack operations that are independent from any other sequence of bytecodes within, typically, a basic block or within a thread. Bytecode traces can be executed parallel in multiple operand stacks, provided they don't have any local-variable dependency or memory dependency between them. With a microarchitecture support to issue and execute Java instructions from the bytecode traces in parallel, the performance of Java applications would significantly be increased. In this paper, we have mainly focused to present the methodology of identifying, extracting and evaluation of parallelism that can be exploited with bytecode traces. Our observation with SPECjvm'98 applications reveals that the number of traces available within a basic block and number of Java instructions that could be issued in parallel are significant. Furthermore, considering bytecodes traces beyond basic blocks for speculative execution increases the number of instructions issued in parallel.

1 Introduction

By exploiting Instruction Level Parallelism (ILP), processors can increase the amount of work performed in parallel and, hence, speed of execution. Current Superscalar processors have many techniques to exploit ILP. In Java machines, however, such techniques have so far not been very successful in exploiting higher level of ILP or Bytecode Level Parallelism (BLP). Most of the current Java applications run on a native processor with the help of Just-In-Time (JIT) compilers [11, 13, 14]. JIT is mostly a software layer that compiles the bytecodes just before they are executed and converts the bytecode into the native code. And thus the emphasis is on the exploitation of ILP techniques that are in the native processor. The research that has been done so far proves that the hardware realization of the Java Virtual Machine (JVM), which executes the bytecode in the hardware, is faster than the JIT compiled bytecode execution [3, 10]. But executing instructions in parallel in the former is harder because of the inherent sequential nature of bytecodes that are targeted for a stack machine, mainly due to stack operand dependency.

A study on available BLP with SPECjvm'98 workloads is reported in [2]. The available BLP was found out to be an average of 5.6 within a basic block and 19.8 when speculating past control flow. The challenge is to effectively extract this available BLP in the Java applications. Some research has been done to determine the effectiveness of in-order multiple issue with SPECjvm'98 workloads in [1]. The result showed that there are only a few instances when 2-way and 3-way multiple-instruction issues possible: stack dependency restricts the availability of independent instructions that can be processed in parallel. Finding a larger amount of instructions to execute in parallel requires examining a large group of instructions, called the instruction window. The larger the instruction window, the larger amount of ILP could be exploited.

A relatively common techniques that has been used to enhance some JVM implementations in hardware is instruction folding, in which a set of bytecodes are folded to one instruction [5, 4]. This increases the performance by coalescing bytecodes which just spends the cycle time in moving the data from the stack to the operational units and then followed by the instruction which does the actual operation on the moved data. Another high performance Java Processor, MAJC [6], is a multi-processor on a chip and exploits ILP by VLIW instruction set, and Thread Level Parallelism (TLP) vertical multithreading. The disadvantage is that the bytecodes needs to be compiled for MAJC instructions.

In this paper we propose a technique in which a larger number of bytecodes are examined multiple series of bytecodes, called bytecode traces, to extract from a thread. There are no dependencies between bytecode traces through stack operands. Hence, the bytecode traces can be processed in parallel, each on a different operand stack.

The rest of this paper is organized as follows. The motivation for the work is discussed in Section 2. In Section 3, the bytecode traces are defined and explained in detail, with examples. The overview of the architecture to execute the bytecode traces is then described in Section 4. Simulation methods and bytecode trace performance results are presented in Section 5. Finally, in Section 6, we discuss future work to be carried out to realize the extended benefits of bytecode traces.

2 Motivation

The exploitation of Java BLP is an active research area, with two main focal points. One is the conversion of Java bytecodes to native processor instructions (such as SPARC or x86 instructions), thereby exploiting the available ILP techniques in executing the translated instructions for that processor. The other is the exploration of new techniques to extract available BLP for a Java processor in which the Java bytecodes are directly executed. This work focuses on the latter part.

Superscalar processors extract ILP through the use of dynamic scheduling to issue multiple instructions per cycle; typically, multiple instructions are issued in-order [17], or out-of-order [7, 8]. The register-based instructions are executed in parallel when there is no dependency between them. But, with the stack-based instructions, such as Java bytecodes, parallel execution is heavily restricted, due to the false dependencies introduced through the stack operands.

Fig. 1 Example code snippet, code generation to SPARC instructions and to bytecodes. The SPARC pseudo-code is based on the assumption that the operands a,b,c, and d are available in the registers.

| Sample code snippet $x = (a*b) + (b*c);$ $y = (a*d) - (b*d);$ | | | |
|---|---|---|---|
| 3-address register instruction | Java bytecode | | opstack depth |
| mul a,b,t1 | push a | // moves A to the top of the stack | 1 |
| mul b,c,t2 | push b | // moves B to the top of the stack | 2 |
| add t1,t2,x | mul | | 1 |
| mul a,d,t3 | push b | | 2 |
| mul b,d,t4 | push c | | 3 |
| sub t3,t4,y | mul | | 2 |
| | add | | 1 |
| | pop x | // moves the result to X | 0 |
| | >>>> *opstack* = 0 <<<< | | |
| | push a | | 1 |
| | push d | | 2 |
| | mul | | 1 |
| | push b | | 2 |
| | push d | | 3 |
| | mul | | 2 |
| | sub | | 1 |
| | pop y | >>>> *opstack* = 0 <<<< | 0 |

Let us consider the sample code snippet and the corresponding three-address register based RISC instruction and the equivalent Java bytecode shown in Fig. 1 to explain the problems with Java bytecode execution and how these can be resolved. We shall assume that there are four multipliers available, that a multiplication completes in a cycle, and that the register file has multiple ports to access the registers in parallel.

In a single-issue register based simple scalar processor, the code in Fig. 1 takes six cycles to complete, with each instruction being issued in a different cycle. With an in-order 4-way issue Superscalar processor, it takes three cycles to complete: the first two *mul*s are issued in the first cycle, *add* and the next two *mul*s are issued in the second cycle, and, finally, the *sub* is issued in the third cycle. In case of a stack-based machine, it would take six cycles, similar to that of a simple scalar processor, assuming that non-computational instructions *push* and *pop* are finished in zero time by coalescing it with the computational instruction that consumes the operands pushed or poped from the stack, as suggested in [9]. The operand flow in the stack machine is explained in Fig. 2.

The BLP exploitation is possible with Java bytecodes, if we can extract sequences of bytecodes that are non-stack dependent and issue them in out-of-order. This idea of removing stack-based false dependencies in the Java bytecode with bytecode traces is the primary motivation for this work.

Fig. 2 Operand flow in a stack machine for an example code given in Fig. 1

```
Cycle 1:
    variable A from local variable stack --> top of the operand stack, opstack[0]
    variable B from local variable stack --> opstack[1]
    opstack[0] and opstack[1] --> MUL unit, and the result is pushed back to opstack[0]
Cycle 2:
    variable B from local variable stack --> opstack[1]
    variable C from local variable stack --> opstack[2]
    opstack[1] and opstack[2] --> MUL --> opstack[1]
Cycle 3:
    opstack[0] and opstack[1] --> ADD --> opstack[0]
    opstack[0] --> local variable stack, and stores as the value of X.
Cycle 4:
    variable A from local variable stack --> opstack[0]
    variable D from local variable stack --> opstack[1]
    opstack[0] and opstack[1] --> MUL --> opstack[0]
Cycle 5:
    variable B from local variable stack --> opstack[1]
    variable D from local variable stack --> opstack[2]
    opstack[1] and opstack[2] --> MUL --> opstack[1]
Cycle 6:
    opstack[0] and opstack[1] --> SUB --> opstack[0]
    opstack[0] --> local variable stack, stored as a value of Y
```

With an out-of-order 4-way issue processor, the code showed in Fig. 2 would get executed in just 2 cycles - all four *mul*s can be issued in one cycle and *add* and the *sub* issued in the second cycle. Similarly, if a stack based machine has two stacks to operate on, and if it can issue instructions out-of-order on two different stacks, then first expression x=(a*b)+(b*c) may be executed on one stack, and the other stack independent expression y=(a*d)-(b*d), may be executed concurrently on the other stack as explained in Fig. 3. Thus, these two expressions can be completed in 3 cycles, by performing (a*b) on stack1 and (a*d) on stack 2 in the first cycle, (b*c) on stack 1 and (b*d) on stack2 in the second cycle, and *add* on stack1 and *sub* on stack 2 in the third cycle.

Fig. 3 Bytecode traces, from the example code shown in Fig. 1, are executing on different operand stacks in parallel: bytecodes from the trace-1 are executing in operand stack-1 and bytecodes from the trace-2 are executing in operand stack-2.

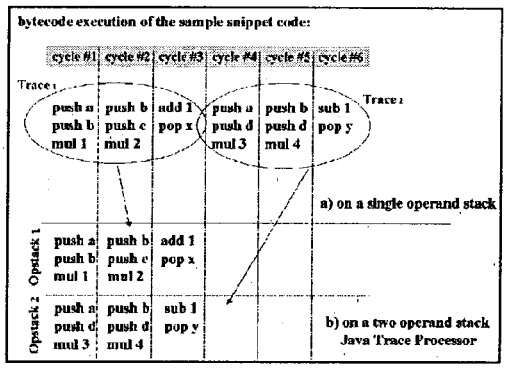

3 Java Bytecode traces

In the stack-based Java Machine, all the operands are moved on top of the operand stack (opstack) before they are executed. During the processing of the bytecodes, the opstack grows and shrinks. When there are no operands in the opstack, it is said to be clean; we shall refer to such a stage of processing as an opstack clean point. A sequence of bytecode that lies between opstack clean points is bytecode trace or simply trace. There is a opstack dependency between the bytecodes of a trace. But, a trace is opstack-independent from other traces. This gives flexibility of scheduling traces to different opstacks, so that they can then run in parallel. Thus, a bytecode trace could be defined as the sequence of Java bytecodes, which are opstack-independent from the rest of the bytecodes of a basic block or of a thread.

3.1 Trace-extraction procedure

We now demonstrate, with a practical example, how the traces are identified and extracted using stack clean. Consider, for example, the segment of code below, taken from a program "compress" of SPECjvm'98 benchmarks.

```
public void compress() {
    int fcode;
    int i = 0;
    int c;
    int ent;
    int disp;
    int hsize_reg;
    int hshift;
<skip>
while ( (c = Input.getbyte()) != -1) {
    in_count++;
    fcode = (((int) c << maxbits) + ent);
    /* xor hashing */
    i = ((c << hshift) ^ ent);
    int temphtab = htab.of (i);
    if ( htab.of (i) == fcode ) {
    ....
}
```

Fig. 4 Bytecode trace extraction process - an example

The trace constructions from the code are shown in Figure 4, with identifying stack clean points and stack-depth calculations for every instruction. The stack clean point is identified and the PC is marked, which is the start PC of the trace. As with each bytecode, stack growth or shrink is calculated. And, at the detection of another stack clean point, again the PC is marked, which is the end PC of the trace. The above procedure is repeated till all the traces are identified in a basic block.

In the trace examples shown in Fig. 4, the bytecode, which moves the operand(s) in to the clean opstack, becomes the first bytecode of a trace. And the bytecode, which moves out the operand(s) to make the opstack clean again, is the last bytecode of a trace. Java bytecode iinc is a special Java instruction, which doesn't operate on top of the opstack; instead, it operates on the local variable itself. The operand from the local variable is moved to the adder unit to perform increment operation, and result is placed back to the same local variable slot in the local variable stack. Thus the instruction is opstack-independent and therefore is a trace.

3.2 Inter-trace dependencies

Java bytecodes posses three variants of data dependency: memory (or global) dependency, local variable dependency and stack operand dependency. Since bytecode traces removes the operand stack dependency, the other two dependencies are the one that could restrict the traces to execute in parallel. There are three basic data dependencies that could exist between traces: Read-after-Write (RAW), Write-after-Read (WAR), and Write-after-Write (WAW) dependency. The Read-after-Write dependency is a true data dependency; the other two dependencies may resolved by using stack renaming technique, which is similar to register renaming [9] in conventional Superscalar processors.

The data dependencies need to be identified well before the traces are scheduled, if the traces are to be executed in parallel. The memory dependency is well determined only at run time. That leaves only the possibility of detecting local variable dependency between traces. To detect inter-trace local variable dependency, every local variable accessing instruction of a trace should be compared with every other elder trace, with respect to trace number. If traces are compared for local variable data dependencies within a basic block, then only a small number of traces need be compared. This is because the basic block in Java code is very small: 90% of the basic blocks consist of fewer than 16 bytecodes each. But with such limited comparison, there are not many traces -- in most case not more than 3 -- that can be run in parallel, which means little BLP would be exploited. On the other hand, if traces beyond basic blocks are compared for inter-trace dependencies, then a larger number of traces must be compared, which would increase the complexity of the logic. However, the advantage is that more data-independent trace can be extracted and executed in parallel, thus exploiting greater BLP. The additional overheads are that the traces of a basic block may have to be compared with the traces of both the next possible basic blocks -- the primary and alternate basic block.

3.3 Non clean-stack traces

There can be multiple traces within a basic block, a trace and the basic block could be the same, and, in few rare cases, a trace can extend beyond a basic block. If the end of a trace is not a control transfer instruction, then the trace may end in any one of the next basic blocks -- primary or alternate basic block, depends on the path the execution control takes as illustrated in Table. 1.

The trace that starts at the main basic block (main bb) at, PC=A, stretches beyond the end of the main basic block. It may end at either PC=X, in the alternate basic block, or at PC=Y, in primary basic block. The difficulty with such a trace is that opstack dependency is imposed across basic block. One way to handle this is to split the trace into three traces, as shown in Table. 1, and mark these as non clean-stack traces. It is then left to the trace scheduler of the underlying architecture that executes bytecode traces to schedule them on the same opstack, i.e. [T1 and T3] or [T1 and T2] should be executed on the same opstack.

Table 1 Non clean-stack trace spanning across basic blocks

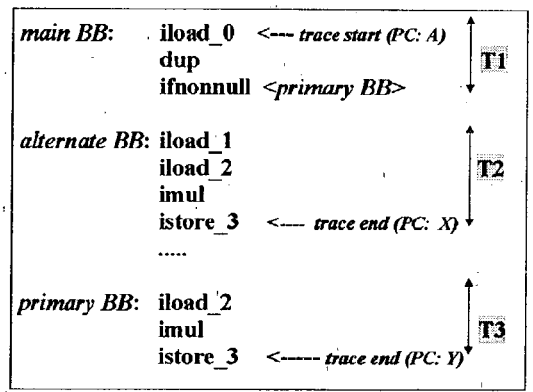

On an initial study, we found that almost all-basic blocks (more than 95%) start and end with a stack clean point. This implies that the only traces of a basic block which do not end with stack clean point are those that extend beyond the basic block. Because there are not many such traces in Java applications, they may be serialized without much performance penalty.

3.4 Bytecode Trace Execution

To exploit the BLP with bytecode traces, a architecture that implements Java VM on the hardware with the capability to schedule multiple traces to the execution unit in parallel is needed. We refer to the architecture that executes bytecode traces as the Java Trace Processor. We have proposed a Java Trace Processor in [18], where the trace scheduling and multi-issue logic, trace cache and other supportive architectures were discussed. We limit the discusion in this paper only with bytecode trace identification, extraction and evaluation methodologies.

In a typical Java Trace Processor the trace execution is expected as discussed below. A group of traces are to be selected to run and bytecodes would be issued from all the selected traces. The group of traces may be from same basic block or from different basic block depending on the control speculation strategy. Each trace should run on its designated operand stack. On completion of a trace, the scheduler may look for another trace to fill the issue slot to exploit the BLP as much as possible by keeping the issue slots as busy as possible. If there are N operand stacks, then N data-independent traces can be scheduled. If N traces are not readily available to schedule in parallel, then whatever traces are available are selected to schedule. When the issue logic is not able to select N bytecodes to issue, it could fill the issue slots with bytecodes from different methods or from different threads of the same program; this is a major architecture design choice and it is beyond the scope of this paper.

4 Simulation study of Bytecode trace performance

We have taken the open-source Java Virtual Machine, Kaffe [12] as an initial simulation environment. We have integrated a few main components of the Java Trace Processor design on to the interpreter VM of Kaffe. We have implemented the trace-extraction and inter-trace dependency analysis in Method Verification procedure and Trace Scheduler and multi-issue logic. The workload chosen was SPECjvm'98 benchmark applications [15]. An initial study was conducted to determine the number of traces that are available within a basic block and the number of bytecodes that can be issued in parallel. The study was conducted with the assumption that there is infinite number of opstacks and issue slots available. But, practically after looking back the results, just 4 to 8 opstack and issue slots are sufficient to execute the trace bytecodes within a basic block. The experiments were conducted without coalescing bytecodes that just eat cycle time in data transfer between the stack and the functional units.

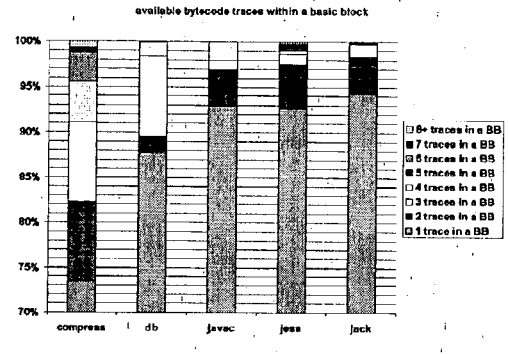

Fig. 5 Available traces within a basic block in SPECjvm'98 applications

The available number of traces in Fig. 5 shows that in some applications like compress and db, the number of multiple traces within a basic block is around 15-30% of the available total traces. For other applications, the available number of traces is much less (below 10 %). To exploit ILP, more traces are needed so that more bytecodes may be scheduled in parallel. Since there are not many traces within a basic block, speculating beyond the basic block to find more traces is the next obvious step.

Fig. 6 shows the number of bytecodes from different traces that can be issued in parallel for execution. It is assumed that there are no memory dependencies between traces; only local variable dependencies between traces are considered here. The applications compress, db, and javac have independent traces, which allows almost 11-19% of the bytecodes to run in parallel. There is some 2-way, 3-way and 4-way issue width present in these applications. In the data base application, db [Fig. 6 (b)] there is large number of 2-way issue width available.

Fig. 6 (a)-(e): Available bytecode issue-width from the traces within a basic block

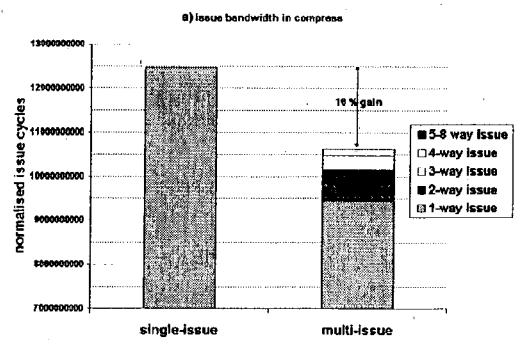

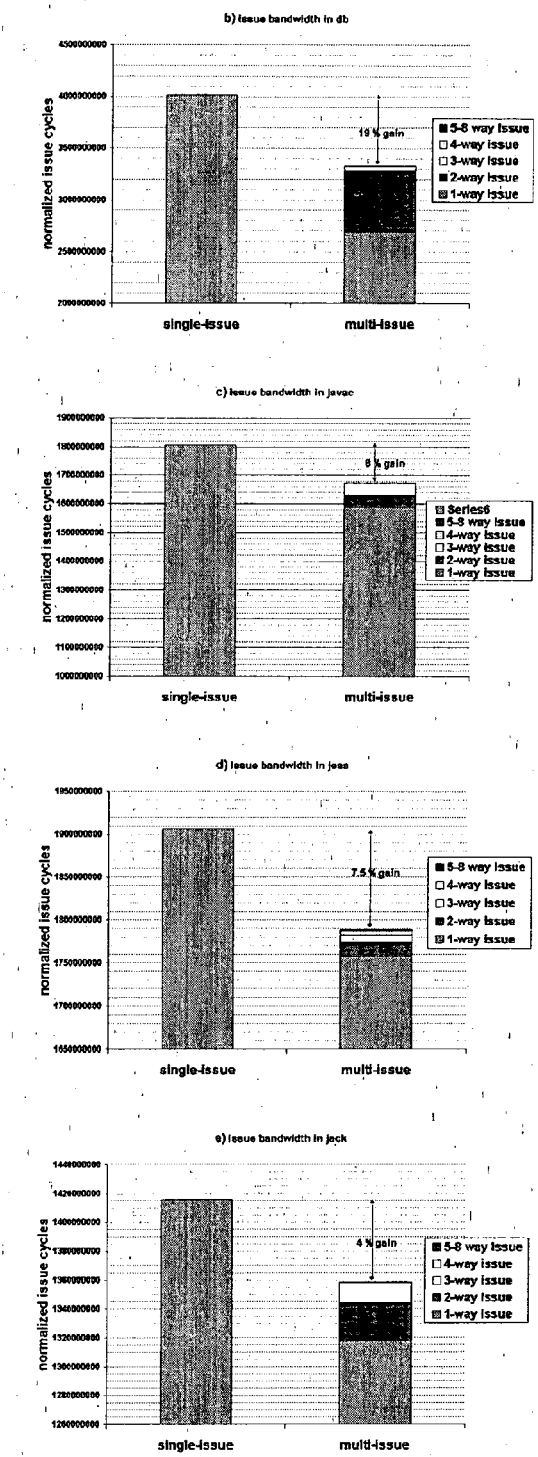

The compress and data base applications are frequently used applications in the network environment; many multimedia applications do compression, and they may benefit from speeding up that routine. There is very little issue-width available beyond 4-way. This is because the number of traces in a basic block rarely exceeds four.

The applications shown in Fig. 6 (c) - (e) have few bytecodes to execute in parallel. The reason for this is that, as Fig. 5 shows, there is not that many traces in the application itself. As mentioned earlier, speculatively scheduling traces beyond basic block boundaries should improve the chances of the multi-issue bandwidths to go beyond four. We are in the process of experimenting with this.

5   Conclusion and Future works

We defined a new technique called bytecode traces to exploit bytecode-level parallelism in Java programs. Initial study proves that there is significant gain to be made in processing the SPECjvm'98 applications when executing instructions from bytecode traces in parallel. The study of executing traces beyond a basic block is going on, and it is expected to double the performance gains.

There is some degree of parallelism present within a trace. For example let us consider the code shown in Fig. 1. In both Trace-1 and Trace-2 there are two multiplications that could be done in parallel provided the results are properly moved into operand stack in the correct program sequence. We are currently studying the possiblity of extracting the above mentioned intra-trace parallelism.

6   Literature

[1] R. Radhakrishnan, D.Talla and L.K. John: Allowing for ILP in an Embedded Javas Processor, proc. 27th Intl' Symp on Computer Architecture, June 2000

[2] Kevin Scott and Kevin Skadron: BLP: Applying ILP Techniques to Bytecode Execution, proc. 2nd annual workshop on hardware support for objects and microarchitecture for Java, September 17, 2000, Austin.

[3] Iffat H.Kazi, etal.: Techniques for obtaining High Performance in Java Programs, ACM Computing Surveys, Vol.32, PP 213-241, September 2000.

[4] picoJava-II Programmer's Reference Manual, Sun microsystems, 1997

[5] Lee-Ren Ton, Lung-Chung Chang, Min-Fu Kao, Han-Min Tseng: Instruction Folding in Java Processor, Proc. of Intl. conference on Parallel and Distributed Systems, 1997.

[6] MAJC architecture tutorial, Sun microsystems, http://developer.java.sun.com/developer/products/majc/docs.html

[7] Eric Rotenberg, Quinn Jacobson, iannakis Sazeides, Jim Smith: Trace Processors: Exploiting Hierarchy and Speculation. Ph.D. Thesis, University of Wisconsin, 1999.

[8] Gurindar S. Sohi, Scott E. Breach, T.N.Vijayakumar: Multiscalar Processors, In Proc. of the 22nd Annual Intl. Symposium on Computer Architecture, pages 414–425, 1995.

[9] K.Watanabe, W. Chu, and Y. Li: Exploiting Java Instruction/Thread Level Parallelism with Horizontal Multithreading, Proc. Of the 6th Australasian Computer Systes Architecture Conference, Australia, January 2001.

[10] Vijaykrishnan N, Ranganathan N, and Gadekarla: Object-oriented Architecture Support for a Java Processor, Proc. of the 12th European conference on Object-OrientedProgramming, July 1998.

[11] T. Cramer, R. Friedman, T. Miller, D. Seberget, R. Wilson, and M. Wolczko: Compiling Java just in time, IEEE Micro, Vol 17, May-June 1997.

[12] T.Wilkinson: Kaffe: A JIT and Intreting Virtual Machine to Run Java Code, http://www.transvirtual.com http://www.kaffe.org, 1998.

[13] Byung-Sun Yang, Soo-Mook Moon, Seongbae Park, Junpyo Lee: LaTTe: A Java VM Just-in-Time Compiler with Fast and Efficient Register Allocataion, In Intl. Conference on Parallel Architectures and Compilation Techniques, October 1999.

[14] Sun Microsystems's HotSpot JVM, http://java.sun.com/products/hotspot

[15] SPEC JVM98 Benchmarks, http://www.spec.org/osg/jvm98/

[16] Lindholm T. and Yellin F.: The Java Virtual Machine specification, Addision-Wesley, 1996.

[17] James E. Smith, and Gurindar S. Sohi: The Micorarchitecture of Superscalar Processors, Proceedings of the IEEE, vol. 83, pp. 1609–1624, Dec. 1995.

[18] R. Achutharaman: Exploiting Java BLP with Java Trace Processor, Technical Research Report, Nanyang Technological University, Singapore, November 2001.

Exploiting Java-ILP on a Simultaneous Multi-Trace instruction Issue (SMTI) Processor

Abstract

The available *Instruction Level Parallelism in Java bytecode (Java-ILP)* is not readily exploitable using traditional in-order or out-of-order issue mechanisms due to dependencies involving stack operands. The sequentialization due to stack dependency can be overcome by identifying bytecode traces, which are sequences of bytecode instructions that when executed leave the operand stack in the same state as it was at the beginning of the sequence. Instructions from different bytecode traces have no stack-operand dependency and hence can be executed in parallel on multiple operand stacks. We propose a simultaneous multi-trace instruction issue (SMTI) architecture for a processor that can issue instructions from multiple bytecode traces to exploit Java-ILP. The proposed architecture can easily take advantage of nested folding to further increase the ILP. Extraction of bytecode traces and nested bytecode folding are done in software during the method verification stage, and add little run-time overhead. We carried out our experiments in our SMTI simulation environment with SPECjvm98, Scimark benchmarks and Linpack workload. SMTI combined with nested folding resulted in an average ILP speedup gain of 54% over the base in-order single-issue Java processor.

1. Introduction

With platform independence as its core feature, Java technology has become extremely popular and is found in a variety of systems, ranging from embedded systems to high performance server systems. The wide spread deployment of Java also necessitates the need for high performance.

1.1. Related Work

General purpose and high performance machines use either interpretation or Just-In-Time (JIT) compilation to convert the Java bytecodes to native instructions which are then run on conventional processors. While interpretation is simple, it is neither efficient nor well-suited to high performance applications. The JIT approach [3, 23], incurs runtime overheads in translating bytecodes to native code, although the efficiency in executing native code more than offsets the translation cost. Recent research has led to adaptive dynamic compilation in which methods that are repeatedly executed are retranslated and traditional compiler optimizations are then applied to obtain more efficient translated code [1, 6].

Processors to execute bytecode directly are also becoming popular as increasingly larger number of complex server applications are developed in Java and it is important to achieve very high performance for these server applications [8, 9, 13]. The designs of such processors are mainly based on stack architectures. Although such processors have primarily been considered for embedded applications, they are also now slowly being adapted for high-end server applications. A major issue in these architectures is that the extent of ILP is limited by the dependency (introduced by stack operands) between Java bytecodes.

Several techniques to exploit available ILP in Java bytecode have been investigated in recent research [4, 5, 12, 15, 18]. Stack operation folding is one technique that eliminates stack operand dependency by converting a set of bytecodes into a register-based instruction [2, 21]. This also saves pipeline cycles by eliminating redundant stack-copy operations. Sun's picoJava-II processor does simple instruction folding in hardware at the decode stage of its pipeline [14]. It also implements the stack cache as a register file for parallel access of stack operands to speedup the operand fetch. More complex folding techniques, such as nested folding, are used to further reduce stack operand dependency, but at the expense of increased hardware complexity [2, 4].

Further ILP can be exploited by combining multiple in-order instruction issue and stack operation folding, so that folded instructions operate directly on register operands and in parallel. However, the extent of ILP is limited when execution is restricted to program order [15].

There have been studies on using *thread level*

*parallelism* (TLP) to extract coarse-grained parallelism from Java bytecodes. Sun's MAJC processor proposes a way to run Java methods as threads in hardware and includes speculative execution of multiple threads on to multiple processor cores (on-chip) in order to exploit TLP [12]. Another similar concept was implemented in the Java Multi-Threaded Processor (JMTP) architecture, consisting of a single chip with an off-the-shelf general-purpose processor core coupled with an array of Java Thread Processors (JTP) [5]. However, JMTP needs compiler intelligence to identify the set of concurrent threads that can be forked as JTP threads, and for the MJAC processor, the Java code needs to be JIT compiled.

1.2. Overview of our Work

In this paper, we propose to exploit fine-grained ILP through the use of out-of-order multiple instruction issue and speculative execution. The basic concept is the bytecode traces, which enables out-of-order multi-issue of Java bytecodes. A *bytecode-trace* is a sequence of Java bytecodes that has no stack operand dependency with any other bytecodes in a method. Each bytecode-trace can run independent of, and in parallel with, other traces, on a separate operand stack. To avoid hardware complexity, we extract bytecode-traces in software during the *method verification* stage, where integrity checks are carried out on the bytecodes of a method before the method is executed. We also propose to include folding of bytecodes in the method verification phase. In addition to reducing the hardware complexity, software folding allows us to take advantage of (i) more complex folding patterns, and (ii) nested folding. Our experiments with SPECjvm98 benchmarks reveal that the software overheads for extracting bytecode-traces and folding bytecodes are no more than 28% of the method verification time, which amounts to less than 5% of the total execution time.

The proposed architecture is evaluated using SPECjvm98, Scimark benchmarks and Linpack workloads. In this paper, we have evaluated our architecture by limiting the execution of bytecode-traces within a basic block in parallel. The multi-issue scheduling of bytecode traces within a basic block resulted in an average ILP speedup gain of 13.5%. Bytecode-traces when combined with instruction folding yielded an average ILP speedup gain of 54%.

In the following section we give the motivation for extracting Java ILP using bytecode-traces. In section 3, we discuss Java bytecode-trace extraction. Section 4 describes the proposed architecture. We present performance results in Section 5. The last section summarizes our work.

2. Motivation

Consider, for example, the code snippet shown in Table 1 that illustrates how stack dependencies limit ILP in Java bytecodes.

Table 1. Example code snippet and corresponding bytecodes and folded instructions.

| Sample code snippet |
|---|
| x = (a*b) + (b*c); |
| y = (a*(c-(b*d))); |

| Java bytecodes | | Operand stack contents | Folded instructions | Nested folded instructions |
|---|---|---|---|---|
| b1 | iload a | a | | |
| b2 | iload b | a, b | | |
| b3 | mul | t1(=a*b) | mul a, b, t1 | mul a, b, t1 |
| b4 | iload b | t1, b | | |
| b5 | iload c | t1, b, c | | |
| b6 | mul | t1, t2(=b*c) | mul b, c, t2 | mul b, c, t2 |
| b7 | add | x(=t1+t2) | add t1,t2, x | add t1,t2, x |
| b8 | istore | | | |
| b9 | iload a | a | iload a | |
| b10 | iload c | a, c | iload c | |
| b11 | iload b | a, c, b | | |
| b12 | iload d | a, c, b, d | | |
| b13 | mul | a,c,t3(=b*d) | mul b,d, t3 | mul b, d, t3 |
| b14 | sub | a,t4(=c-t3) | sub stack[top],t3,t4 | sub c,t3, t4 |
| b15 | mul | y (=a*t4) | mul stack[top],t4,y | mul a, t4, y |
| b16 | istore | | | |

The second column in Table 1 shows the contents of the operand stack after the execution of each bytecode instruction. Assume that the operand stack is initially empty. Then, the operand stack contains one or more operands after bytecode instruction b1 and remains non-empty until after instruction b8. Thus the bytecode instructions b1 to b8 have to execute sequentially on a stack machine, as they depend on the contents of the operand stack. Such dependencies are referred to as *stack dependencies*. Bytecode instructions starting from b9 are stack-independent of any of the earlier instructions, but in an in-order issue machine b9 cannot be issued until all earlier instructions (b1 to b8) have been issued. Thus a simple stack machine cannot exploit any parallelism in the above sequence. Assuming each instruction takes one cycle to execute, the Java bytecode sequence shown in Table 1 (column 1) will take 16 cycles in a strict stack machine.

In the given bytecode sequence, the operand stack becomes empty after executing instruction b8 and also after instruction b16. More precisely, if the stack pointer is pointing to some position *p* at the beginning of a Java method or a basic block, then after executing the sequence of bytecode instructions b1 to b8, the stack pointer regains its old value *p*. We shall use the term *clean-stack-point* to refer to a point at which the stack-pointer valued is restored in such a manner. The sequence of Java bytecodes between any two consecutive clean-stack-points form a *bytecode-trace*. Since each bytecode-trace is stack independent of every other bytecode-trace, multiple bytecode-traces can be executed in parallel. In the example of Table 1, there are two bytecode traces: one from b1 to b8 and another from b9 to b16. By taking instructions from different bytecode traces and issuing them in parallel to multiple functional units, each of which has its own private operand stack, instruction-level-parallelism can be exploited. We refer to this instruction-issue approach as *simultaneous multi-trace instruction issue (SMTI)*. SMTI is similar to the approaches followed in Simultaneous Multithreading architectures and Trace Processor [22, 16]. If the bytecodes in Table 1 are issued in this manner, execution of the entire sequence will require only 8 cycles, in contrast with the 16 needed with in-order single issue stack machine.

With instruction folding, the bytecode sequence shown in Table 1 (column 3) can be executed in 8 cycles in an in-order single issue machine. For example, in Table 1, bytecode instructions b1 to b3 may be replaced with a single folded instruction: `mul a,b,t1`. In this example, operands *a* and *b* are local variable and can be accessed in parallel from a local variable register file. Further reduction in redundant stack operations can be achieved by nested folding. Table 1 (column 4) illustrates that the bytecode instructions b9 and b10, which could not be folded in simple folding, can be eliminated in nested folding. With nested folding, the bytecode sequence can now be executed in 6 cycles on an in-order single issue machine.

When the example sequence is executed in a in-order multi-issue processor, it takes 5 cycles to execute folded bytecodes as shown in first column of Table 2, and 4 cycles with nested folding (Table 2, column 2). Whereas, combining bytecode traces and nested folding, the example sequence can be executed in just 3 cycles as shown in the third column of Table 2.

Table 2. Per-cycle parallel execution of Table-1 instructions on in-order multi-issue and multi-trace-issue processors.

| Cycle # | in-order multi-issue + folding | in-order multi-issue + nested folding | multi-trace-issue + nested folding | |
|---|---|---|---|---|
| | | | Issue slot #1 | Issue slot #2 |
| 1 | mul a,b,t1<br>mul b,c,t2<br>add t1,t2,x | mul a,b,t1<br>mul b,c,t2<br>add t1,t2,x | mul a,b,t1 | mul b,d,t3 |
| 2 | iload a | mul b,d,t3 | mul b,c,t2 | sub c,t3,t4 |
| 3 | iload c<br>mul b,d,t3 | sub c,t3,t4 | add t1,t2,x | mul a,t4,y |
| 4 | sub stack[top],t3,t4 | mul a,t4,y | | |
| 5 | mul stack[top] t4,y | | | |

Our proposal for software folding has two main advantages: (i) it is more flexible, as the algorithm can be changed to cover more complex folding patterns; (ii) nested folding takes little time (2% to 6% of method verification time) and eliminates the need for the complex hardware.

3. Bytecode Trace and Instruction Folding

In this section we describe the extraction of bytecode traces and the nested folding of bytecode instructions in software, during the method verification stage. The method verification process is mandatory for server JVMs to check the integrity of the Java bytecodes of a method for security purposes [10]. Hence, performing bytecode trace extraction, local variable data dependence analysis and nested folding during the verification process simplifies the hardware implementation at the cost of a very small penalty in time.

3.1. Bytecode Trace Extraction

The method verification procedure is invoked in the trap handler, and a trap signal is generated when a method-invocation bytecode (invokevirtual, invokestatic, invokespecial, or invokeinterface) is encountered in the decode stage and the target method is called for the first time.

We shall use the code snippet in Figure 1 to explain the bytecode-trace extraction procedure; the code is taken from the *SPECjvm98/201_compress* benchmark. In the bytecode-trace extraction, the operand stack is simulated and the stack depth is tracked, starting with a stack depth of 0, at the beginning of each Java method. As each instruction is processed, the stack depth is calculated. When the stack depth is 0, the current bytecode-trace is ended and a new bytecode-trace is started. In Figure 1, there are 6 bytecode-traces within the basic block.

```
public void compress() {
    int i = 0, c;
    int fcode, ent, disp;
    int hsize_reg, hshift;
....
    while ( (c = Input.getbyte()) != -1 ) {
        in_count++;
        fcode = (((int) c << maxbits) + ent);
        /* xor hashing */
        i = ((c << hshift) ^ ent);
        int temphtab = htab.of [i];
        if ( htab.of [i] == fcode ) {
        ....
    }
```

| PC: Java bytecode | Operand Stack snapshot (stack depth) | | Java code equivalent |
|---|---|---|---|
| 72:aload_0 | sp (1) | start_trace | |
| 73:dup | sp+=1 (2) | | |
| 74:getfield #31 | sp-=1, sp+=1 (2) | | in_count++ |
| 77:iconst_1 | sp+=1 (3) | | |
| 78:iadd | sp-=2, sp+=1 (2) | | |
| 79:putfield #31 | sp-=2 (0) | end_trace | |
| 82:iload_3 | sp (1) | start_trace | |
| 83:aload_0 | sp+=1 (2) | | |
| 84:getfield #34 | sp-=1,sp+=1 (2) | | fcode = |
| 87:ishl | sp-=2,sp+=1 (1) | | (((int)c << |
| 88:iload #4 | sp+=1 (2) | | maxbits)+ |
| 90:iadd | sp-=2,sp+=1 (1) | | ent) |
| 91:istore_1 | sp-=1 (0) | end_trace | |
| 92:iload_3 | sp (1) | start_trace | |
| 93:iload #7 | sp+=1 (2) | | |
| 95:ishl | sp-=2,sp+=1 (1) | | i=((c<<hshift) |
| 96:iload #4 | sp+=1 (2) | | ent) |
| 98:ixor | sp-=2,sp+=1 (1) | | |
| 99:istore_2 | sp-=1 (0) | end_trace | |
| 100:aload_0 | sp (1) | start_trace | |
| 101:getfield #30 | sp-=1,sp+=1 (1) | | htab (loaded into |
| 104:astore #8 | sp-=1 (0) | end_trace | a local variable reg) |
| 106:aload #8 | sp (1) | start_trace | |
| 108:getfield #47 | sp-=1,sp+=1 | | temphtab = |
| 111:iload_2 | sp+=1 (2) | | htab.of(i) |
| 112:iaload | sp-=2,sp+=1 (1) | | |
| 113:istore #8 | sp-=1 (0) | end_trace | |
| 115:iload #8 | sp (1) | start_trace | |
| 117:iload_1 | sp+=1 (2) | | if(htab.of[i]== |
| 118:if_icmpne 134 | sp-=2 (0) | end_trace | fcode) |

Figure 1. Bytecode-trace extraction process; code snippet from *SPECjvm98/ 201_compress*

There can be one or more bytecode-traces within a basic block, and in a few rare cases a trace can extend beyond a basic block. A bytecode-trace that ends within a basic block is called a *complete bytecode-trace*, and that which extends beyond a basic block is an *incomplete bytecode-trace*. An incomplete bytecode-trace is stack dependent on the bytecode-trace of a following basic block, which is again an incomplete bytecode-trace that depends on the former. If the end of the trace is a control transfer instruction, then the bytecode-trace may end in any one of the next basic blocks, primary or alternate basic block, depending on the path the execution control takes. Incomplete bytecode-traces, each of which typically spans two or more basic-blocks, are run sequentially on the same stack. Our study reveals that more than 95% of the bytecode-traces are complete.

In the example of Table 3, if a control transfer takes place from instruction b3 to b8, then the incomplete trace *t1* of basic block 1 and the incomplete trace *t3* of the basic block 3 should be scheduled to execute on the same stack. The bytecode-trace scheduling logic should take care of scheduling such incomplete trace sequences on the same stack.

Table 3. An Incomplete trace spanning multiple basic blocks $z = x / ((y != 0) ? y : 1)$.

| Basic block#: trace# | Bytecode sequence | Comments |
|---|---|---|
| bb1: t1 | b1: iload x<br>b2: iload y<br>b3: ifeq b8 | bb1 ends; t1 ends incompletly |
| bb2: t2 | b4: iload y<br>b5: idiv | next primary BB (of bb1) starts |
|  | b6: istore x<br>b7: goto b11 | end of trace t1 (complete) |
| bb3: t3 | b8: iconst_1<br>b9: idiv | next secondary BB (of bb1) starts |
|  | b10: istore x | end of trace t1 (complete) |

Once the bytecodes are extracted, information on the bytecode-traces, including the trace-id, trace-start PC, trace-end PC, and the basic-block id, etc., is stored in a *basic block trace table* (BBTT) in the proposed architecture.

3.2. Local Variable Dependence Analysis

In addition to stack operand dependencies, data dependencies on local variables can exist within and across bytecode traces. Dependencies within a trace are resolved through sequential execution of bytecode instructions and dependencies across bytecode-traces are identified along with the bytecode-trace extraction procedure, during the method verification stage. Local variables are allocated and accessed with constant indices in Java bytecodes. Hence static analysis of local variable data dependence across bytecode is possible and sufficient. The inter-trace dependency information across bytecode-traces is extracted statically and is stored in BBTT. For each bytecode-trace, the ids of other bytecode-traces on which it is dependent on are stored in the BBTT.

*Memory dependency* arising from object reference, such as class and arrays, are speculated and detected during run-time. *Control dependence* analysis between bytecode-traces is not necessary, because only bytecode-traces that are within a basic block are scheduled for execution.

3.3. Folding and Nested Folding

In our approach we use the same set of folding groups as implemented in picoJava II [14]. Nested folding is performed by recursively applying folding on bytecode sequences that have folded instructions. A folded bytecode instruction replaces a sequence of bytecodes and it may alter the subsequent instructions and their target addresses. Hence, the instruction and target address are recalculated for the entire method. The folded instructions along with the bytecodes of a method are stored in a *method instruction buffer* and also in a *method cache* during the execution of the method.

4. SMTI Java Processor Architecture

We propose a five stage Java processor pipeline with instruction-fetch, decode, issue, execute and store/commit stages. The schematic block diagram of the SMTI Java processor architecture is shown in Figure 2.

4.1. Trace Fetch and Decode

The instructions are fetched from the method cache. The bytecode-trace fetch logic uses the trace information from the BBTT to select traces that are free from local variable dependency. The traces are selected from the same basic block. The program-counter values of selected traces are passed to *instruction fetch* (IF) controller, which then fetches the bytecode instructions from the *method cache*. After fetching all the traces of a basic block, the trace fetch logic starts selecting the traces from the next basic block as predicted by the branch predictor. We assume a simple 2-bit branch prediction using a Branch Prediction Table (BPT).

We propose a decoder similar to that of picoJava-II decoder to handle both bytecode instructions and folded instructions. The decoded instructions are placed in the *decoded trace buffer (DTB)*. The DTB is implemented as multiple small buffers to separately hold decoded instructions from each trace. The number of such buffers is twice the issue width, which is the maximum number of instructions that the trace scheduler can issue in a cycle, to keep the scheduler busy.

4.2. Trace Scheduler

Bytecode-traces have no stack dependence and hence can be executed in parallel. Further the fetched traces do not have any local variable dependence among themselves. Among the traces in DTB, the trace scheduler selects some, based on a priority function that depends on the available resources; such a function could be simply based on the trace-ids. The instruction issue order within a bytecode-trace is in-order, whereas instruction issue between bytecode-traces is out-of-order. Each selected trace is assigned to a dedicated operand stack (OPstack) and a Reservation Station (RS). From the selected bytecode-traces, one instruction from each trace is issued to a dedicated RS. The trace scheduler maintains sufficient trace program-counters to keep track of the issued traces.

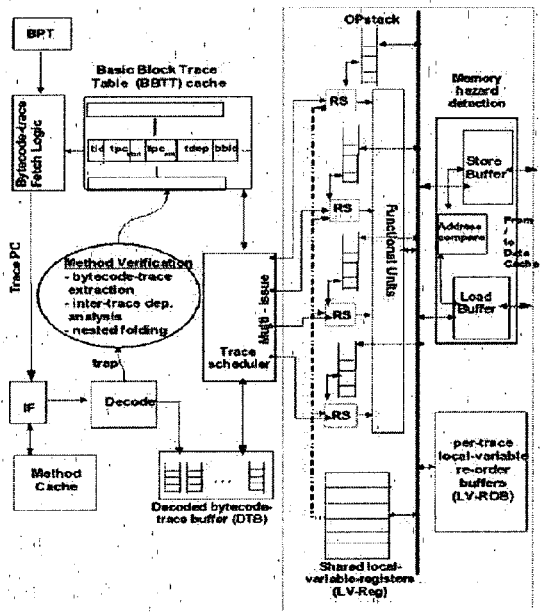

Figure 2. Multi-trace instruction issue (SMTI) Java processor architecture.

4.3. Bytecode-Trace Execution

The RS controls the operand movement among a dedicated OPstack, the shared local variable registers (LV-Reg), and a pool of functional units. The operands for the instructions may be loaded from or stored to any one of several locations -- the OPstack, LV-Regs, and the data cache. The RS gets the required operands from any of these source locations, and dispatches them to the functional unit or to the OPstack (in the case of instructions which push onto or pop from OPstack). Each OPstack is implemented as a register stack cache, as in the picoJava processor [14], in order to enable parallel access of stack operands for folded Java instructions. Each bytecode-trace does run-time local variable Writes with the per-trace local variable reorder buffer (LV-ROB). Reads of the shared local variable register are passed through the LV-ROB to ensure that any WAR hazards are avoided. The organization of LV-ROB is similar to that of a reorder buffer in a superscalar processor [19].

4.4. Memory Mis-Speculation Handling

The out-of-order memory dependency between bytecode-traces is detected at run-time by the memory hazard-detection logic. The memory-hazard unit basically consists of a load buffer, a store buffer and comparator circuits [19]. The trace id is stored along with the data in each entry of the load and store buffers. Further, we assume that the trace-ids uniquely specify the program order, i.e., the larger the trace id, the later the trace appears in the basic block. The speculative *stores* (from traces that are executing out of program order) are always written into the store buffer. A speculatively executed *load* may take the value from the store buffer, if there is an entry in the buffer corresponding to a *store* from this or an earlier trace to this address location; otherwise, the value is loaded from the D-Cache.

The conditions in which the memory dependencies are detected are shown in Figure 3. When a *load* or *store* is executed, the following actions are carried out by the memory hazard-detection logic: (i) A search is done on the load / store buffer to check whether some other trace running out-of-order (with a greater trace id) has issued a memory write. (ii) If so, the dependency type (RAW, WAR, or WAW) is determined by comparing the trace-ids and checking the operation type. (iii) If the dependency is a WAR, the current trace fetches the data from the data cache, ignoring the value in the load / store buffer that has been modified by the elder traces (as shown in Figure 3b).

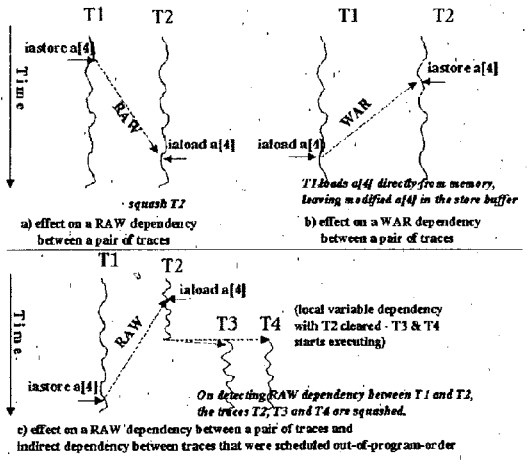

Figure 3. Memory dependency detection at run time across multiple speculated traces T2,T3,etc., with the program order trace (non-speculative) T1.

iv) If the dependency is a WAW, the current trace makes a separate entry in the store buffer. Multiple store-buffer entries with the same address, by different trace ids, will not introduce an inconsistency, since at trace commit only the entry *store* made by a highest trace id will be flushed in to the D-cache. (v) If the dependency is a RAW, which is a true dependency, the elder traces and their dependent traces are squashed and rescheduled (as shown in Figures 3a and 3c).

The following actions are carried out to squash a trace: (i) all the entries of the victim trace in the LV-ROB are deleted; (ii) all the load / store entries made by the victim trace in the load / store buffer are invalidated; and (iii) the OPstack assigned for the trace is cleared.

4.5. Trace Commit

When the last instruction of a trace that is executing in the program order (non-speculative trace) completes, the local variables modified by the trace from LV-ROB are written to LV-Regs and the trace is said to be committed. At the same time, the trace's committed value in the load / store buffers is flushed to the data cache.

5. Performance Results

We simulate the proposed architecture by modifying the open source Java VM interpreter, Kaffe [7]. Nested folding is implemented using folding groups similar to that of picoJava-II and extended to multiple nesting levels. We used SPECjvm98 [20], Scimark [17], and Linpack [11] benchmarks. The data set used for SPECjvm98 applications is s1. The Scimark and Linpack benchmarks were included in order to study the benefits of bytecode-traces on scientific workloads.

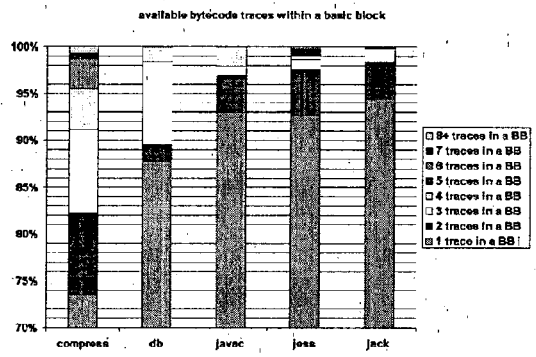

Figure 4. Available bytecode traces within a basic block in SPECjvm98 applications.

First, we determine the amount of available bytecode-trace-level parallelism within a basic block. In measuring the available parallelism, we have considered inter-trace local-variable data dependency, but assumed that there exist no memory dependency at run-time. Figure 4 shows the available parallelism, a dynamic performance measure, in SPECjvm98 applications. From Figure 4, we observe that in the various benchmark programs that we used, 75% - 95% of the basic blocks have only one trace. The instance when two traces occur in a basic block range from 2% to 9%; and for the cases where three or four traces in a basic block ranges from 1% to 9%. In some of the applications there are very few basic blocks that contain more than four traces. Hence, we chose to implement an optimal 4-way trace issue bytecode-trace scheduler in our experiments.

We also report the software overhead involved in performing trace extraction, inter-trace dependency analysis and folding during method verification stage in Table 4. On an average, the software overhead is about 28% of the method verification time, and in terms of total execution time the software overhead accounts only for less than 5%.

Table 4. Software overhead in bytecode-trace extraction, inter-trace dependency analysis, folding and nested folding.

| Application | Time taken to perform (in % of method verification time) | | | |
|---|---|---|---|---|
| | inter-trace extraction and dependency analysis | folding | nested folding | Total |
| compress | 22.00% | 0.50% | 2.60% | 25.10% |
| jess | 18.00% | 0.40% | 2.20% | 20.60% |
| db | 25.00% | 0.50% | 3.00% | 28.50% |
| javac | 27.00% | 0.60% | 3.00% | 30.60% |
| jack | 31.00% | 0.70% | 4.00% | 35.70% |
| mtrt | 27.00% | 0.70% | 3.20% | 30.90% |
| mpegaudio | 20.00% | 1.00% | 4.50% | 25.50% |
| scimark | 23.00% | 0.50% | 6.00% | 29.50% |
| linpack | 24.00% | 0.50% | 3.00% | 27.50% |

To study the gain in ILP and speedup with SMTI architecture, we ran two types of simulations: one in which every bytecode instruction takes a single cycle, and the other in which the number of cycles taken by different bytecodes vary according to the picoJava-II processor specification [14]. The former is useful in determining ILP gain or ILP speedup purely from the multiple instruction issue viewpoint. The latter is helpful in determining the actual speedup, which is indicative of the actual performance gain in an SMTI architecture. In our simulation, we have assumed an ideal instruction cache as *method cache*.

The ILP gain on a SMTI architecture with bytecode-trace issue for the different benchmarks is depicted in Figure 5. The effects of simple and nested folding on bytecode-traces are also shown (the set of bars denoted by SMTI in the figure). The results are compared with a single-issue Java processor with simple and nested folding (the set of bars shown as SI in the figure). The instruction window for nested folding is the entire basic block in the case of single-issue; for the multi-trace issue, the window is limited to the length of a bytecode-trace.

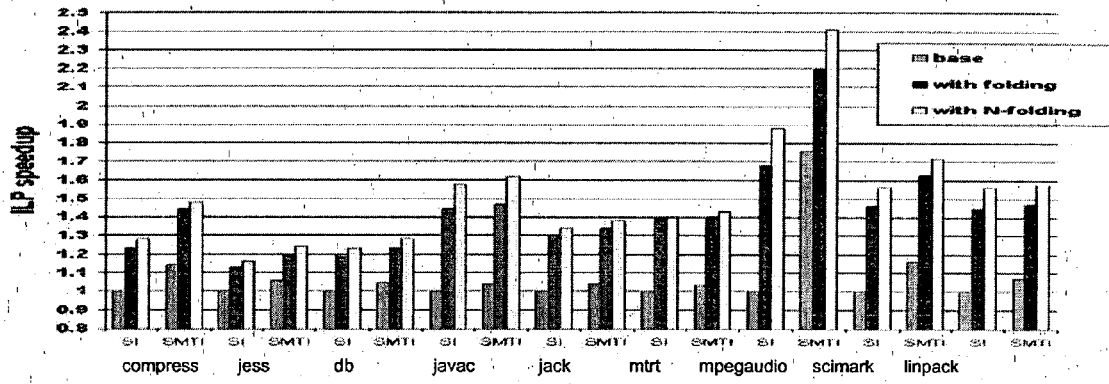

Figure 5. ILP speedup gain: SMTI machine vs. the in-order single-issue (SI) stack machine.

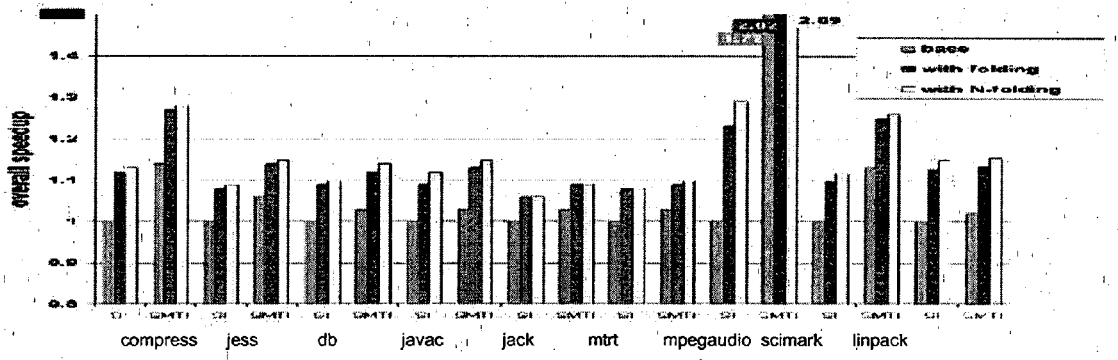

Figure 6. Overall speedup: single-issue (SI) stack machine vs. SMTI machine.

The ILP gain with multi-trace issue over single-instruction issue is observed (from Figure 5) to range from 3% to 16% for all applications, except mpegaudio, where the gain is 76%. We can see the ILP gain increases with nested folding, even on a single-issue architecture, from 16% to 88%. When nested folding is enabled on SMTI, the ILP increases further, ranging from 16% to 141%.

The actual speedup obtained using non-unit instruction cycles, is shown in Figure 6. With bytecode-trace issue on a SMTI architecture, an improvement of 2% to 14% in speedup is observed, and with nested folding included, the speedup ranges from 9% to 28% for all applications, except mpegaudio. Compared to this, in-order single-issue (SI) with nested folding achieved an speedup of only 6% to 15%. The speedup gain for mpegaudio is 72% with SMTI and increases to 109% for SMTI with nested folding. Whereas, the in-order single-issue with nested folding gives the speedup of only 29% for mpegaudio.

The reasons for the much higher performance observed in mpegaudio with SMTI architecture is that the code contains more traces within a basic block with lesser inter-trace dependency constraints, and thus, more of these traces are executable in parallel. Table 5 shows the percentage of instructions executed in parallel with multi-trace-issue and when combining multi-trace-issue with nested folding. The percentage of two, three and four instructions executed in parallel is much higher for mpegaudio than for any other applications.

Table 5. Percentage of instructions executed in parallel on a SMTI architecture.

| Applications | Number of instructions executed in parallel | | | | | |
|---|---|---|---|---|---|---|
| | 2 | | 3 | | 4 | |
| | MI | MI+NF | MI | MI+NF | MI | MI+NF |
| compress | 14.40% | 17.00% | 3.80% | 4.40% | 3.30% | 3.20% |
| jess | 6.70% | 6.90% | 2.95 | 2.40% | 1.10% | 1.20% |
| db | 5.40% | 5.20% | 2.40% | 1.80% | 0.40% | 0.30% |
| javac | 4.20% | 4.90% | 1.60% | 1.00% | 0.30% | 0.30% |
| jack | 4.10% | 3.10% | 2.70% | 1.60% | 0.10% | 0.10% |
| mtrt | 1.80% | 2.00% | 2.60% | 1.30% | 0.10% | 0.10% |
| mpegaudio | 19.30% | 22.90% | 17.80% | 4.60% | 11.50% | 10.00% |

MI: with multi-trace instruction issue on the bytecodes
MI + NF: with multi-trace instruction issue on the folded instructions Let us quickly compare the performance of SMTI with the previous research work of in-order multi-issue of the folded Java instructions [15]. As per the results declared in [15], the proportion of instructions that was executed in parallel ranged from 11% to 21% for two instructions, whereas that for three instructions remained at less than 3%; and there were no sets of four instructions available for issue. Table 5 shows that with SMTI, where simultaneous multi-trace-issue is combined with nested folding, higher ILP can be exploited.

Lastly, we report certain statistics on local-variable memory dependence and trace squashing due to memory dependence mis-speculation. On an average, over the benchmarks used in our study, 15% of the traces have a local-variable dependence with another trace in the same basic block. The number of traces squashed due to mis-speculation account for less than 2% of the total (dynamic) traces for all applications. Thus we find the squashing overhead due to memory dependence mis-speculation is very small, possibly because the traces running speculatively in parallel are limited to a single basic block.

To summarize, the geometric mean of ILP gain and that of actual gain in speedup over all the applications are shown in Table 6. With SMTI and nested folding, the ILP gain is 54% and the actual speedup gain is 25%. We anticipate that, speculative simultaneous multi-trace instruction issue, which issues instructions from traces beyond basic block, in a control speculative manner, will yield even better performance.

Table 6. Average (geometric mean) speedup with bytecode-folding, multi-trace-issue and the combination of both for the taken benchmark set.

|  | With SI + NF | With SMTI | With SMTI + NF |
|---|---|---|---|
| ILP gain | 43.00% | 13.50% | 54.00% |
| Speedup gain | 12.40% | 12.00% | 24.50% |

6. Conclusions

A new technique called bytecode-traces has been proposed to exploit Java-ILP. We have also proposed an architecture, the Simultaneous Multi-Trace Issue (SMTI) architecture, to schedule multiple traces on different operand stacks in parallel. Further the effect of folding and nested folding with bytecode-trace execution on the SMTI Java processor has been studied, and it has been shown that combining multi-trace issue with nested folding has significantly increased the average ILP over a single issue bytecode processor. The bytecode-trace extraction and nested folding are done in software, during bytecode verification phase, eliminating the need for additional hardware.

Our immediate future work will be to extend parallel bytecode-trace execution beyond single basic blocks to exploit greater Java-ILP.

Reference

[1] M.G. Burke, J.-D. Choi, S. Fink, D. Grove, M. Hind, V. Sarkar, M.J. Serrano, V. Sreedhar, H. Srinivasan, and J. Whaley, *The Jalapeno dynamic optimizing compiler for Java*, In ACM Java Grande Conference, June 1999, pp. 129-141.

[2] L.-C. Chang, L.-R. Ton, M.-F. Kao, and C.-P. Chung, *Stack operations folding in Java Processor*, IEEE proceedings on Computers and Digital Techniques, vol. 145, pp. 333-340, September 1998.

[3] T. Cramer, R. Friedman, T. Miller, D. Seberget, R. Wilson, and M. Wolczko, *Compiling Java just in time*, IEEE Micro, Vol.17, pp. 36-43, May-June 1997.

[4] M.W. El-Kharashi, F. Elguibaly, and K. Li, *An Operand Extraction-Based Stack Folding Algorithm*, In 2nd annual workshop on Hardware support for Objects and micro architecture for Java, September 2000, pp. 22-26.

[5] R. Helaihel, and K. Olukotun, *JMTP: An Architecture for Exploiting Concurrency in Embedded Java Applications with Real-time Considerations*, In the international Conference on Computer-Aided Design, November 1999, pp.551-557.

[6] *HotSpot JVM*, http://java.sun.com/products/hotspot

[7] *Kaffe Virtual Machine*, http://www.kaffe.org

[8] *LavaCORE: Configurable Java Processor Core*, http://www.derivation.com

[9] *Lightfoot Java Processor Core*, http://ww.dctl.com/lightfoot.html.

[10] T. Lindholm and F. Yellin, *The Java Virtual Machine Specification*, 2nd edition, Addison-Wesley, 1999.

[11] Linpack, http://www.netlib.org/linpack

[12] *MAJC architectural tutorial*, Sun Microsystems, http://developer.java.sun.com/developer/products/majc/

[13] J.M. O'Connor and M. Tremblay, *picoJava-I: The Java virtual machine in hardware*, IEEE Micro, March-April 1997, Vol.17, pp 45-53.

[14] *picoJava-II programmer's reference manual*, Sun Microsystems, 1997.

[15] R. Radhakrishnan, D. Talla, and L.K. John, *Allowing for ILP in an Embedded Java Processor*, In the international Symposium on Computer Architecture, June 2000, pp. 294-305.

[16] E. Rotenberg, Q. Jacobson, Y. Sazeides, J. Smith, *Trace Processors*, In the international symposium of microarchitecture, December 1997, pp. 138-148.

[17] *Scimark*, http://math.nist.gov/scimark2

[18] K. Scott and K. Skadron, *BLP: Applying ILP techniques to Bytecode Execution*, In the workshop on hardware support for objects and micro architecture for Java, September 2000.

[19] J.E. Smith, and G.S. Sohi, *The micro architecture of Superscaler Processors*, In proceedings of the IEEE, vol. 83, pp. 1609-1624, December 1995.

[20] *SPEC JVM98 Benchmarks*, http://www.spec.org/osg/jvm98.

[21] L.-R. Ton, et al., *Instruction folding in Java Processor*, In the international conference on Parallel and Distributed Systems, 1997.

[22] D. Tullsen, S.J. Eggers, H.M. Levy, *Simultaneous Multithreading: Maximizing on-chip Parallelism*, In the international Symposium on Computer Architecture, 1995, pp. 392-403.

[23] B.-S. Yang, S.-M. Moon, S. Park, J. Lee, *LaTTe: A Java VM Just-in-Time compiler with Fast and Efficient Register Allocation*, In the international Conference on Parallel Architectures and Compilation Techniques, October 1999.

What is claimed is:

1. A method for executing instructions in parallel, the method comprising the steps of:
identifying a set of traces within a segment of code, each trace representing a sequence of instructions within the segment of code that are execution structure dependent;
identifying a dependency order between traces in the identified set of traces, the dependency order indicating traces that are dependent upon operation of other traces in the segment of code; and
executing traces within the set of traces in parallel and in an execution order that is based on the identified dependency order, such that at least two traces are executed in parallel and such that if the dependency order indicates that a second trace is dependent upon a first trace, the first trace is executed prior to the second trace.

2. The method of claim 1 wherein identifying a set of traces within the segment of code comprises:
identifying a beginning trace instruction in the segment of code whose operation corresponds to a first clean condition of an execution structure;
identifying a subsequent trace instruction in the segment of code whose operation corresponds to a non-clean condition of the execution structure; and
identifying an ending trace instruction in the segment of code whose operation follows the first clean condition and the non-clean condition of the execution structure and that corresponds to at least one of:
i) a second clean condition of the execution structure; and
ii) an end of the segment of code; and
designating, as a trace within the segment of code, all instructions in the segment of code including, and in-between, the beginning trace instruction and the ending trace instruction.

3. The method of claim 2 wherein identifying a beginning trace instruction comprises:
simulating performance of an instruction in the segment of code;
analyzing a contents of the execution structure, and if the simulated performance of the instruction causes the execution structure to be empty of instruction operands, thus indicating the first clean condition of the execution structure, performing the operations of:
i) identifying a program counter associated with the instruction whose performance was simulated as the beginning of the trace; and
ii) identifying the instruction whose performance was simulated as the beginning trace instruction.

4. The method of claim 3 wherein identifying a subsequent trace instruction in the segment of code whose operation corresponds to a non-clean condition of the execution structure comprises:
continually simulating performance of at least one instruction in the segment of code that follows the beginning trace instruction;
after simulated performance of each of the at least one instruction in the segment of code that follows the beginning trace instruction, calculating instruction operand placement within the execution structure to determine that the execution structure contains instruction operands associated with the continued simulated performance, thus defining a non-clean condition of the execution structure.

5. The method of claim 4 wherein identifying an ending trace instruction in the segment of code comprises:
after simulated performance of each of the at least one instruction in the segment of code that follows the beginning trace instruction, calculating instruction operand placement within the execution structure to determine that the execution structure contains no instruction operands associated with the continued simulated performance of the at least one instruction in the segment of code that follows the beginning trace instruction and in response:
identifying a program counter associated with the instruction whose performance was most recently simulated as the ending of the trace; and
identifying the instruction whose performance was most recently simulated as the ending trace instruction.

6. The method of claim 5 wherein the execution structure is a stack and wherein calculating instruction operand placement within the execution structure comprises:
calculating at least one of stack growth or stack shrinkage of instruction operands with the stack as a result of simulated execution of instructions; and
wherein:
the beginning trace instruction corresponds to an instruction for which simulated execution caused the stack to grow from the clean condition to the non-clean condition;
the ending trace instruction corresponds to an instruction for which simulated execution caused the stack to grow from the non-clean condition to the clean condition; and
the trace defines a continuous sequence of instructions from the beginning trace instruction to the ending trace instruction during which simulated execution causes the stack to contain at least one operand associated with trace instructions whose execution was simulated.

7. The method of claim 2 wherein identifying a set of traces within the segment of code comprises:
identifying a beginning trace instruction in the segment of code whose operation corresponds to a first clean condition of an execution structure;
identifying a subsequent trace instruction in the segment of code whose operation corresponds to a non-clean condition of the execution structure and corresponds to an end of a segment of code, and in response:
i) designating, as a trace within the segment of code, all instructions in the segment of code including, and in-between, the beginning trace instruction and the subsequent trace instruction; and
ii) identifying, with a trace dependency structure, the trace as a non-clean trace; and
iii) identifying any subsequent traces of code to which execution control may be transferred after execution of the subsequent trace instruction as non-clean traces.

8. The method of claim 7 wherein the end of the segment of code is identified as at least one of:
an end of a basic block;
a transfer of control from the ending trace instruction to an instruction that does not immediately follow the ending trace instruction; and
a transfer of control from the ending trace instruction of a first trace to a beginning trace instruction of a second trace.

9. The method of claim 2 wherein identifying a set of traces within the segment of code comprises:
repeating the steps of identifying a beginning trace instruction, identifying a subsequent trace instruction, identifying an ending trace instruction and designating a trace for subsequent sequence of instructions in the segment of code, such that all traces in the segment of code are identified; and associating a trace number to each trace identified in the segment of code, the trace number being incremented to indicate a trace order of identified traces.

10. The method of claim 1 wherein there are multiple segments of code that form an executable program, and wherein the step of identifying a set of traces comprises:

identifying all traces in all segments of code in the executable program as the set of traces; and associating a trace number to each trace as it is identified in the segments of code, the trace number being incremented to indicate a trace order of identified traces, such that traces having trace numbers lower that other trace number of other traces are considered elder traces.

11. The method of claim 10 wherein identifying a dependency order between traces in the identified set of traces comprises:

for each current trace in the set of traces:

comparing variable accessing instructions within the current trace to variable accessing instructions within other traces in the set of traces to identify a potential trace dependency in which the current trace contains variable accessing instructions that are dependent upon the operation of other variable accessing instructions in at least one of the other traces in the set of traces; and if the current trace is determined to contain variable accessing instructions that are dependent upon the operation of another variable accessing instruction in at least one other trace, indicating a trace dependency in a trace dependency structure that identifies the current trace as dependent upon the at least one other trace.

12. The method of claim 11 wherein the potential trace dependencies include at least one of a read-after-write dependency, a write-after-read dependency, and a write-after-write dependency between a variable accessing instruction in the current trace and at least one other variable accessing instruction in the at least one other trace in the set of traces.

13. The method of claim 11 wherein comparing variable accessing instructions within the current trace to variable accessing instructions within other traces in the set of traces comprises:

only comparing variable accessing instructions within the current trace to variable accessing instructions within other traces having a trace number that is lower that the current trace number, such that the current trace is only compared for dependency order to other traces that are elder traces to the current trace.

14. The method of claim 11 wherein identifying a set of traces within a segment of code comprises:

identifying a beginning trace instruction in the segment of code whose operation corresponds to a first clean condition of an execution structure;

identifying a subsequent trace instruction in the segment of code whose operation corresponds to a non-clean condition of the execution structure and corresponds to an end of a segment of code, and in response:

i) designating, as a trace within the segment of code, all instructions in the segment of code including, and in-between, the beginning trace instruction and the subsequent trace instruction; and ii) identifying, with a trace dependency structure, the trace as a non-clean trace; and iii) identifying any subsequent traces of code to which execution control may be transferred after execution of the subsequent trace instruction as non-clean traces.

15. The method of claim 14 wherein executing traces within the set of traces in parallel and in an execution order that is based on the identified dependency order comprises:

selecting at least two traces from the set of traces to execute in parallel in a multiple execution structure trace processor, the at least two traces selected from the set of traces based on trace dependencies expressed in the trace dependency structure, and wherein each of the at least two traces selected is not dependent upon any other trace that has not already executed in the multiple execution structure trace processor;

executing the at least two traces in parallel, each trace executing in conjunction with a respective execution structure in the multiple execution structure trace processor; and upon completion of execution each of the at least two traces, updating the trace dependency structure to remove any trace dependencies associated with other traces in the set of traces that are dependent upon completion of execution of the trace that completed execution.

16. The method of claim 15 wherein selecting at least two traces from the set of traces to execute in parallel in a multiple execution structure trace processor comprises:

selecting a number of traces for execution in parallel that is equivalent to a number of respective execution structures in the multiple execution structure trace processor.

17. The method of claim 15 wherein executing traces within the set of traces in parallel and in an execution order that is based on the identified dependency order further comprises:

repeating selecting at least two traces, executing the at least two traces, and updating the trace dependency table in order to execute, in parallel, traces in segments of code that form a program.

18. The method of claim 15 wherein executing the at least two traces in parallel comprises:

maintaining load and store buffers during execution of the at least two traces to track execution of load and store instructions in the at least two traces;

detecting an execution-time memory dependency during the parallel execution of the at least two traces; and operating a memory dependency recovery procedure to recover from the execution-time memory dependency.

19. The method of claim 1 wherein:

the instructions are Java bytecode instructions;

the segment of code is a sequence of Java bytecode instructions that is at least one of:

i) a basic block; and ii) a thread;

the execution structure is an operand stack that a multiple execution structure trace processor uses to perform the Java bytecode instructions; and wherein each trace in the set of traces is a sequence of Java bytecode instructions that are operand stack independent from a remainder of Java bytecode in that segment of code.

20. The method of claim 1 wherein identifying comprises:

identifying a beginning trace instruction in the segment of code whose operation corresponds to a first clean condition of an execution structure, wherein the first clean condition indicates a first empty condition of the execution structure;

identifying a subsequent trace instruction in the segment of code whose operation corresponds to a non-clean condition of the execution structure; and identifying an ending trace instruction in the segment of code whose operation follows the first clean condition and the non-clean condition of the execution structure and that corresponds to at least one of:

i) a second clean condition of the execution structure, wherein the second clean condition indicates a second empty condition of the execution structure; and ii) an end of the segment of code; and designating, as a trace within the segment of code, all instructions in the segment of code including, and in-between, the beginning trace instruction and the ending trace instruction.

21. A computer program product for identifying Java instructions that can execute in parallel, the computer program product having a computer-readable medium including computer program logic encoded thereon that, when performed on a computer system including a display, directs the computer system to perform the method of:

identifying a set of traces within a segment of Java code, the Java code stored within the computer system, each trace representing a sequence of Java bytecode instructions within the segment of code that are stack dependent;

identifying a dependency order between traces in the identified set of traces, the dependency order indicating traces that are data dependent upon operation of other traces in the segment of code, the dependency order displayed on the display of the computer system, and executing traces within the set of traces in parallel and in an execution order that is based on the identified dependency order, such that at least two traces are executed in parallel and such that if the dependency order indicates that a second trace is dependent upon a first trace the first trace is executed prior to the second trace.

22. The computer program product of claim 21 including computer program logic that directs the computer system to perform the method of:

executing, within the computer system, traces within the set of traces in parallel and in an execution order that is based on the identified dependency order, such that at least two traces are executed in parallel and such that if the dependency order indicates that a second trace is dependent upon a first trace, the first trace is executed prior to the second trace.

23. The computer program product of claim 21 wherein identifying comprises:

identifying a beginning trace instruction in the segment of code whose operation corresponds to a first clean condition of an execution structure, wherein the first clean condition indicates a first empty condition of the execution structure;

identifying a subsequent trace instruction in the segment of code whose operation corresponds to a non-clean condition of the execution structure; and identifying an ending trace instruction in the segment of code whose operation follows the first clean condition and the non-clean condition of the execution structure and that corresponds to at least one of:

i) a second clean condition of the execution structure, wherein the second clean condition indicates a second empty condition of the execution structure; and ii) an end of the segment of code; and designating, as a trace within the segment of code, all instructions in the segment of code including, and in-between, the beginning trace instruction and the ending trace instruction.

24. A trace processor capable of executing instructions in parallel, the trace processor comprising:

a trace detector that can receive as input a segment of code and can identify a set of traces within the segment of code, each trace in the set of traces representing a sequence of instructions within the segment of code that are execution structure dependent;

a dependency detector coupled to the trace detector to receive the identified set of traces, the dependency detector capable of identifying a dependency order between traces in the identified set of traces, the dependency order indicating traces that are dependent upon operation of other traces in the segment of code;

a trace scheduler coupled to the dependency detector and the trace detector; and a trace executer coupled to the trace scheduler, the trace executer including a plurality of functional units, each including a respective execution structure;

the trace scheduler receiving the set of traces and the dependency order and causing the trace executer to execute traces within the set of traces in parallel using respective execution structures of respective functional unites, the execution taking place in an execution order that is based on the identified dependency order, such that at least two traces are executed in parallel and such that if the dependency order indicates that a second trace is dependent upon a first trace, the first trace is executed prior to the second trace.

25. The trace processor of claim 24 wherein the trace detector comprises:

means for identifying a beginning trace instruction in the segment of code whose operation corresponds to a first clean condition of an execution structure;

means for identifying a subsequent trace instruction in the segment of code whose operation corresponds to a non-clean condition of the execution structure; and means for identifying an ending trace instruction in the segment of code whose operation follows the first clean condition and the non-clean condition of the execution structure and that corresponds to at least one of:

i) a second clean condition of the execution structure; and ii) an end of the segment of code; and means for designating, as a trace within the segment of code, all instructions in the segment of code including, and in-between, the beginning trace instruction and the ending trace instruction.

26. The trace processor of claim 25 wherein the dependency detector comprises:

means for processing each current trace in the set of traces, the means for processing including:

means for comparing variable accessing instructions within the current trace to variable accessing instructions within other traces in the set of traces to identify a potential trace dependency in which the current trace contains variable accessing instructions that are dependent upon the operation of other variable accessing instructions in at least one of the other traces in the set of traces; and if the current trace is determined to contain variable accessing instructions that are dependent upon the operation of another variable accessing instruction in at least one other trace, means for indicating a trace dependency in a trace dependency structure that identifies the current trace as dependent upon the at least one other trace.

27. The trace processor of claim 26 wherein the trace scheduler comprises:
  means for selecting at least two traces from the set of traces to execute in parallel in a multiple execution structure trace processor, the at least two traces selected from the set of traces based on trace dependencies expressed in the trace dependency structure, and wherein each of the at least two traces selected is not dependent upon any other trace that has not already executed in the multiple execution structure trace processor;
  wherein the trace executer comprises means for executing the at least two traces in parallel, each trace executing in conjunction with a respective execution structure in the multiple execution structure trace processor; and
  wherein the trace scheduler comprises means, upon completion of execution each of the at least two traces, for updating the trace dependency structure to remove any trace dependencies associated with other traces in the set of traces that are dependent upon completion of execution of the trace that completed execution.

28. The trace processor of claim 24 wherein the trace detector comprises:
  identifying a beginning trace instruction in the segment of code whose operation corresponds to a first clean condition of an execution structure, wherein the first clean condition indicates a first empty condition of the execution structure;
  identifying a subsequent trace instruction in the segment of code whose operation corresponds to a non-clean condition of the execution structure; and
  identifying an ending trace instruction in the segment of code whose operation follows the first clean condition and the non-clean condition of the execution structure and that corresponds to at least one of:
  i) a second clean condition of the execution structure, wherein the second clean condition indicates a second empty condition of the execution structure; and
  ii) an end of the segment of code; and
  designating, as a trace within the segment of code, all instructions in the segment of code including, and in-between, the beginning trace instruction and the ending trace instruction.

* * * * *